United States Patent
Nakamura

(10) Patent No.: US 8,422,079 B2
(45) Date of Patent: Apr. 16, 2013

(54) IMAGE FORMING APPARATUS AND IMAGE CORRECTION METHOD FOR CORRECTING SCAN-LINE POSITION ERROR WITH ERROR DIFFUSION

(75) Inventor: Yasuyuki Nakamura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1025 days.

(21) Appl. No.: 12/179,133

(22) Filed: Jul. 24, 2008

(65) Prior Publication Data

US 2009/0034004 A1   Feb. 5, 2009

(30) Foreign Application Priority Data

Jul. 31, 2007   (JP) .................................. 2007-199899

(51) Int. Cl.
G06K 15/00 (2006.01)
G06K 9/00 (2006.01)
G03G 13/04 (2006.01)

(52) U.S. Cl.
USPC ....... 358/3.03; 358/3.04; 358/3.05; 358/3.06; 358/3.13; 358/3.16; 358/3.22; 358/1.9; 358/536; 358/466; 382/251; 382/252; 382/237; 382/270; 382/112; 347/116; 347/131; 347/15

(58) Field of Classification Search .................. None
See application file for complete search history.

(56) References Cited

U.S. PATENT DOCUMENTS

| 5,235,436 | A | 8/1993 | Sakamoto et al. ............ 358/462 |
| 5,438,431 | A | 8/1995 | Ostromoukhov ............. 358/457 |
| 5,815,605 | A | 9/1998 | Koike ............................ 382/269 |
| 5,926,582 | A * | 7/1999 | Kakutani ...................... 382/299 |
| 6,118,463 | A | 9/2000 | Houki et al. |
| 6,134,022 | A | 10/2000 | Yamamoto et al. ............ 358/1.9 |
| 6,236,827 | B1 | 5/2001 | Hada ............................. 399/301 |
| 6,462,838 | B1 * | 10/2002 | Hirata et al. .................. 358/3.05 |
| 6,487,309 | B1 | 11/2002 | Chen ............................. 382/162 |
| 6,714,748 | B1 * | 3/2004 | Nakayasu et al. .............. 399/72 |

(Continued)

FOREIGN PATENT DOCUMENTS

| JP | 1-227576 | 9/1989 |
| JP | 10-324027 | 12/1998 |

(Continued)

Primary Examiner — Steven Kau
(74) Attorney, Agent, or Firm — Fitzpatrick, Cella, Harper & Scinto

(57) ABSTRACT

It is determined whether the pixel of interest in image data to be processed belongs to area 1 not close to a scan line changing point where a scan line changing process is done (S101). If the pixel of interest belongs to area 1, an error diffusion process is performed using an error diffusion matrix for area 1 (S102). If the pixel of interest belongs to area 2 close to the scan line changing point, the error diffusion process is performing using an error diffusion matrix for downward scan line changing for area 2 when the scan line changing process is changing to a lower line, or an error diffusion matrix for upward scan line changing for area 2 when the scan line changing process is changing to an upper line.

8 Claims, 21 Drawing Sheets

U.S. PATENT DOCUMENTS

| | | |
|---|---|---|
| 6,731,400 B1 | 5/2004 | Nakamura et al. ............ 358/1.9 |
| 6,963,423 B2 * | 11/2005 | Ogasahara et al. ............ 358/1.8 |
| 7,286,717 B2 | 10/2007 | Nomizu ........................ 382/280 |
| 7,684,079 B2 | 3/2010 | Takata et al. ................... 358/1.9 |
| 7,692,832 B2 | 4/2010 | Klassen |
| 2003/0206308 A1 | 11/2003 | Matsuya ........................ 358/1.9 |
| 2005/0220523 A1 * | 10/2005 | Fujimori ........................ 400/76 |
| 2006/0119895 A1 * | 6/2006 | Takata et al. ................. 358/3.26 |
| 2006/0226338 A1 | 10/2006 | Tojima et al. ............. 250/208.1 |
| 2006/0232620 A1 | 10/2006 | Kitamura et al. ............. 347/15 |
| 2007/0103728 A1 | 5/2007 | Otani .......................... 358/1.18 |
| 2007/0216954 A1 * | 9/2007 | Kakutani .................... 358/3.06 |
| 2008/0246984 A1 | 10/2008 | Shoji ............................ 358/1.13 |
| 2009/0034007 A1 | 2/2009 | Sano et al. ................... 358/3.13 |
| 2009/0034029 A1 | 2/2009 | Nakamura .................... 358/505 |
| 2009/0034034 A1 | 2/2009 | Ido ................................ 358/525 |

FOREIGN PATENT DOCUMENTS

| | | |
|---|---|---|
| JP | 2002-116394 | 4/2002 |
| JP | 2003-241131 | 8/2003 |
| JP | 2004-170755 | 6/2004 |
| JP | 2006-248096 | 9/2006 |
| JP | 2007-136825 | 6/2007 |

* cited by examiner

FIG. 5A
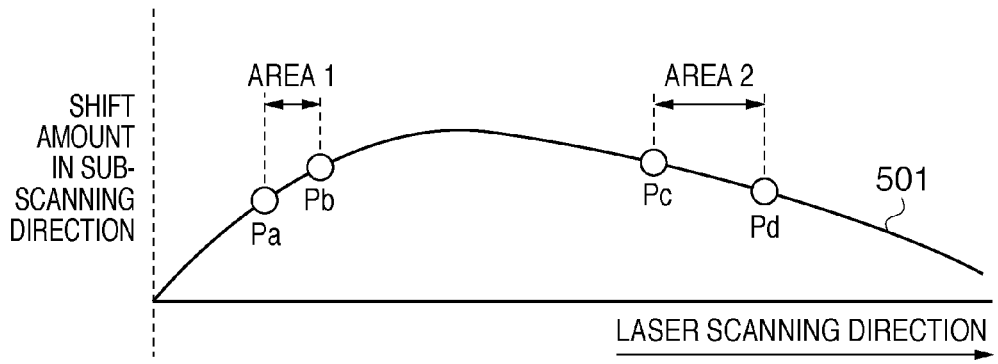
FIG. 5B
FIG. 5C
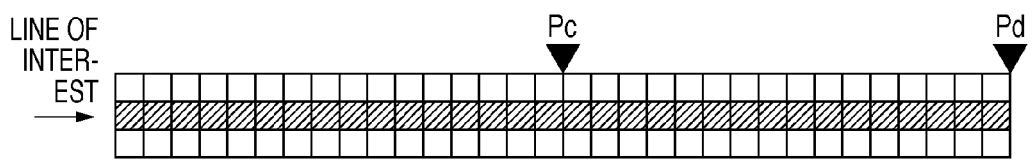
FIG. 5D
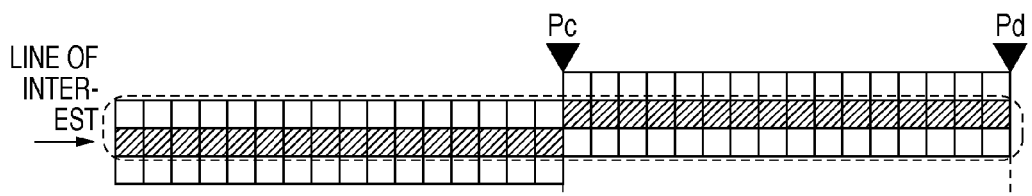
FIG. 5E
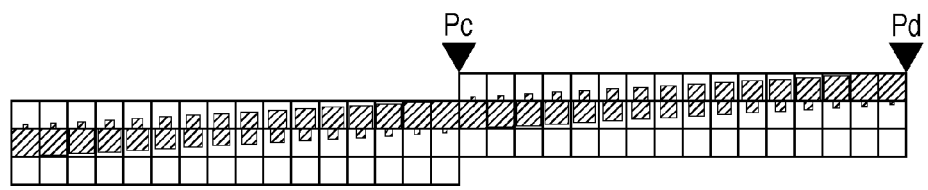

F I G. 5F
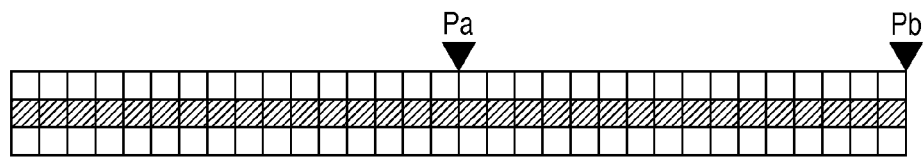
F I G. 5G
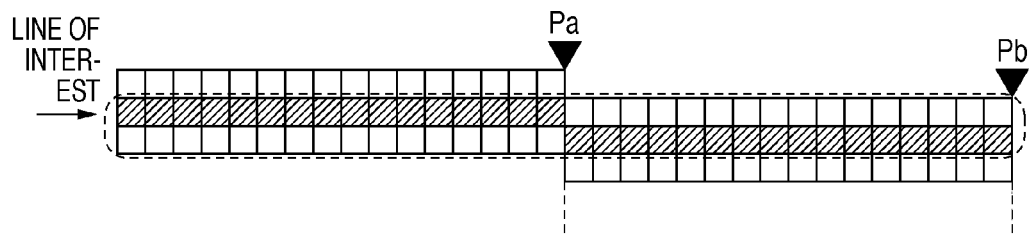
F I G. 5H
F I G. 5I
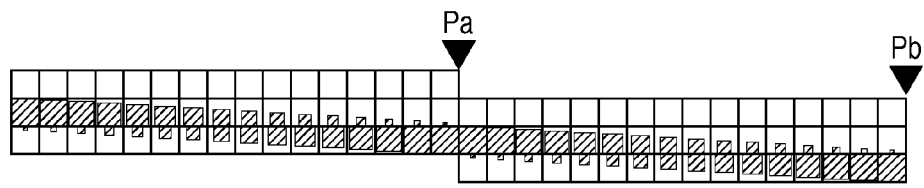

DIRECTION: UPWARD SHIFT

DIRECTION: DOWNWARD SHIFT

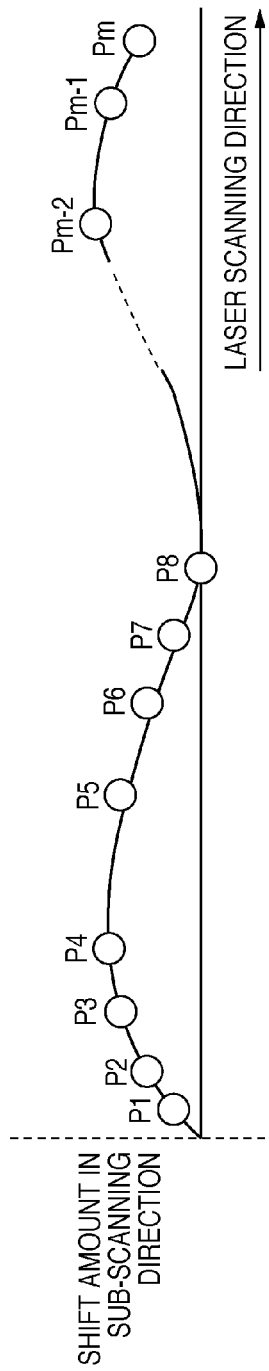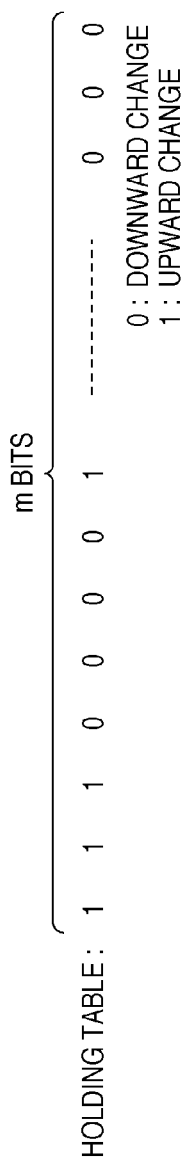

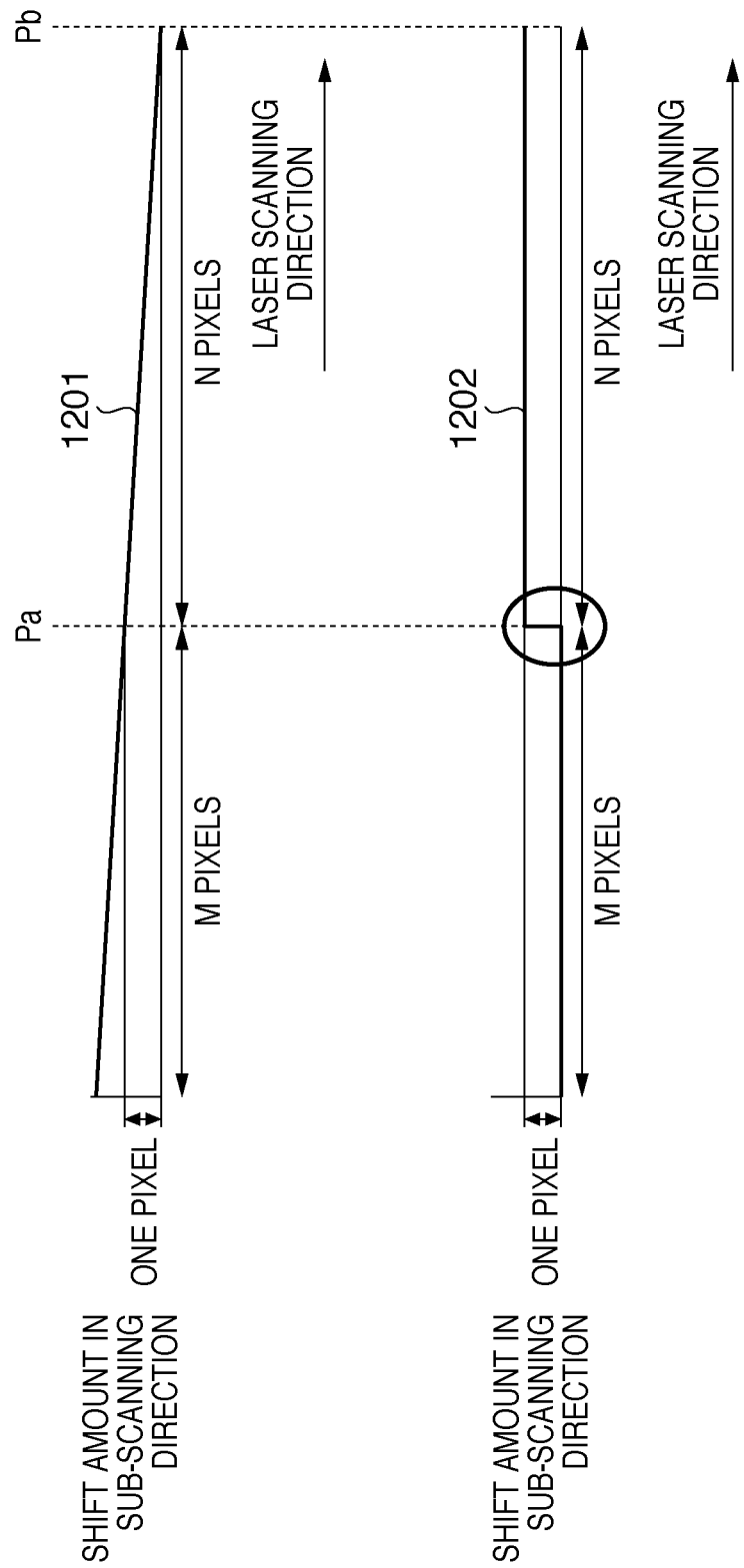

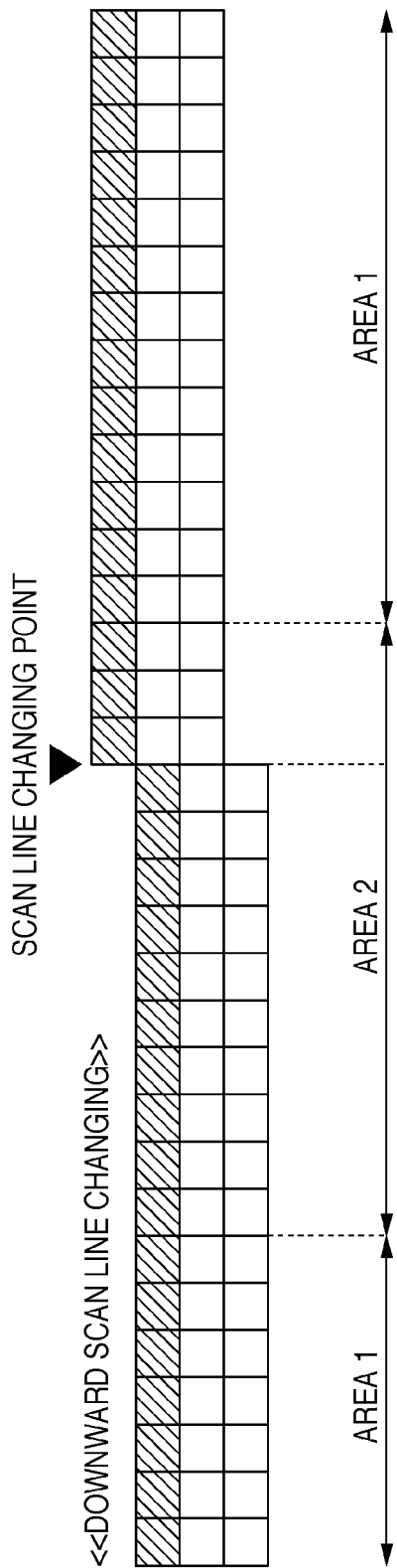
FIG. 13A
FIG. 13B
FIG. 13C

<<ERROR DISTRIBUTION AND DISTRIBUTION POSITION FOR AREA 2>>

Ea>Ea'
Eb<Eb'

<<ERROR DISTRIBUTION AND DISTRIBUTION POSITION FOR AREA 1>>

INCLINATION SHIFT AMOUNT
F I G. 18B
BITMAP IMAGE
(BEFORE TONE CORRECTION)
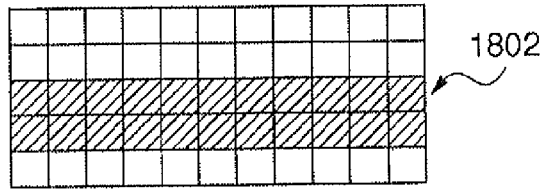
F I G. 18C
CORRECTED BITMAP IMAGE
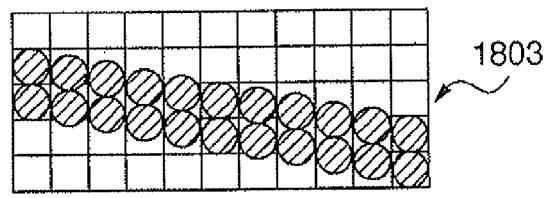
F I G. 18D
BITMAP IMAGE
(AFTER TONE CORRECTION)
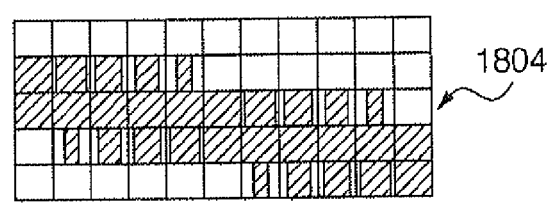
F I G. 18E
EXPOSURE IMAGE
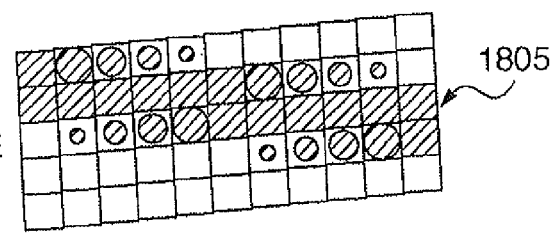
F I G. 18F
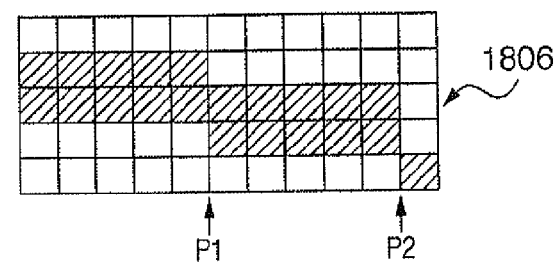

IMAGE FORMING APPARATUS AND IMAGE CORRECTION METHOD FOR CORRECTING SCAN-LINE POSITION ERROR WITH ERROR DIFFUSION

BACKGROUND OF THE INVENTION

1. Field of the Invention

The present invention relates to an image forming apparatus and image forming method and, more particularly, to a color image forming apparatus which forms images independently for respective color components, such as a laser beam printer (LBP), digital copying machine, or multifunction printer (MFP) using an electrophotographic process, and a color image forming method.

2. Description of the Related Art

As a kind of color image forming apparatus such as a printer or copying machine, there is known a tandem type color image forming apparatus which comprises electrophotographic image forming units equal in number to color components and sequentially transfers toner images of respective color components onto a print medium by the image forming units. The image forming unit of each color includes a developing unit and photosensitive drum. It is known that the tandem type color image forming apparatus has a plurality of factors which cause a positional error (to be referred to as a registration error) between images of respective color components.

These factors include the unevenness and attaching positional error of the lens of a deflecting scanning unit including the optical system of a polygon mirror, f θ lens, and the like, and the mounting positional error of the deflecting scanning unit to the image forming apparatus main body. Owing to these positional errors, the scan line does not become a straight line parallel to the rotating shaft of the photosensitive drum, and inclines or skews. If the degree of inclination or skew of the scan line (to be referred to as the profile or shape of the scan line hereinafter) is different between colors, a registration error occurs.

The profile has different characteristics for respective image forming apparatuses, i.e., printing engines, and for deflecting scanning units of respective colors. FIGS. 16A to 16D show examples of the profile. In FIGS. 16A to 16D, the abscissa axis represents a position in the main scanning direction in the image forming apparatus. Lines 160 to 163 expressed as straight lines in the main scanning direction represent the characteristics (profiles) of ideal scan lines free from a skew. Curves 164 to 167 represent the profiles of respective colors, and show examples of the profiles of scan lines for cyan (to be referred to as C hereafter), magenta (to be referred to as M hereafter), yellow (to be referred to as Y hereafter), and black (to be referred to as K hereafter), respectively. The ordinate axis represents a shift amount in the sub-scanning direction from an ideal characteristic. As is apparent from FIGS. 16A to 16D, the curve of the profile is different between colors. When electrostatic latent images are formed on the photosensitive drums of image forming units corresponding to the respective colors, the profile difference appears as the registration error between image data of the respective colors.

As a measure against the registration error, Japanese Patent Laid-Open No. 2002-116394 discloses a method of measuring the degree of skew of a scan line using an optical sensor in the process of assembling a deflecting scanning device, mechanically rotating the lens to adjust the skew of the scan line, and fixing the lens with an adhesive.

Japanese Patent Laid-Open No. 2003-241131 discloses a method of measuring the inclination of a scan line using an optical sensor in the process of mounting a deflecting scanning device into a color image forming apparatus main body, mechanically inclining the deflecting scanning device to adjust the inclination of the scan line, and then mounting the deflecting scanning device into the color image forming apparatus main body.

Japanese Patent Laid-Open No. 2004-170755 discloses a method of measuring the inclination and skew of a scan line using an optical sensor, correcting bitmap image data to cancel them, and forming the corrected image. That is, a shift of an actual scan line from an ideal scan line which is a straight line parallel to the surface of the photosensitive drum to the rotating shaft of the photosensitive drum is canceled by shifting image data by the same amount in an opposite direction. This method corrects image data, and thus does not require a mechanical adjustment member or adjustment step in assembly. This method can downsize a color image forming apparatus, and deal with a registration error at a lower cost than those by methods disclosed in Japanese Patent Laid-Open Nos. 2002-116394 and 2003-241131. The electrical registration error correction is divided into correction of one pixel and that of less than one pixel. In correction of one pixel, pixels are shifted (offset) one by one in the sub-scanning direction in accordance with the inclination and skew correction amounts, as shown in FIG. 17. In the following description, a position where the pixel is offset will be called a scan line changing point, and the process to offset a pixel will be called a scan line changing process. In FIG. 17, P1 to P5 are scan line changing points.

In FIG. 17, a profile 1701 of a scan line is corrected. The profile 1701 may also be expressed by an array of the coordinate values of pixels on a scan line, but in FIG. 17, is expressed by approximate straight lines divided for respective areas. The scan line changing point is a position in the main scanning direction where the profile is scanned in the main scanning direction and shifts by one pixel in the sub-scanning direction. In FIG. 17, P1 to P5 are scan line changing points. At a scan line changing point serving as a boundary, dots after the scan line changing point are shifted by one line in a direction opposite to the shift of the profile in the sub-scanning direction. This process is executed by paying attention to each line. An image 1702 represents an example of image data shifted in the sub-scanning direction at each scan line changing point. In FIG. 17, each hatched portion 1702a is one line before the scan line changing process, i.e., one line in original image data. As a result of the scan line changing process, each line shifts in a direction in which the shift of the profile in the sub-scanning direction is canceled. Image data 1703 represents an example of image data obtained in this manner. Each hatched portion is one line before correction. In image formation, corrected image data is formed for each line. For example, normal image formation proceeds in the order of a line 1721, line 1722, . . . . After image formation, a hatched portion which forms one line in image data before correction is formed on an ideal scan line which should be originally formed. However, the scan line changing process is done for each pixel, so a shift of less than one pixel still remains in the sub-scanning direction.

A shift of less than one pixel that cannot be completely corrected by the scan line changing process is corrected by adjusting the tone value of bitmap image data by preceding and succeeding pixels in the sub-scanning direction, as exemplified in FIGS. 18A to 18F. More specifically, when the characteristic represents an upward inclination, like a profile 1801 in FIG. 18A, bitmap image data before tone correction is corrected to a pixel array 1803 (shown in FIG. 18C) inclined in a direction (downward in this example) opposite to the inclination of the profile. FIG. 18B shows bitmap image data before correction. Image data 1802 is shifted by one pixel in the sub-scanning direction at scan line changing points P1 and P2, like a dot image 1806 in FIG. 18F. To make the image data 1802 close to the ideal image data 1803 after correction, tone correction is executed to smooth steps at the scan line changing points P1 and P2, like a bitmap image 1804 shown in FIG. 18D. FIG. 18D is a view schematically showing the densities of pixels by the width and intensity of a laser pulse for forming these pixels. After exposure, a latent image (exposure image) 1805 as shown in FIG. 18E is formed to smooth steps generated by the scan line changing process. According to this method, the image process can correct the registration error. Tone correction performed for smoothing after the scan line changing process will be called an interpolation process.

Conventional techniques have tried to cancel an unnatural step at a scan line changing point serving as a boundary by separately executing, in accordance with the profile characteristic of an image forming apparatus, correction in which the correction amount exceeds one pixel and correction in which the correction amount is less than one pixel. However, depending on the image forming method for image data for executing registration error correction, if correction of more than one pixel and that of less than one pixel are directly executed for image data, the image deteriorates. More specifically, when a continuous tone image is quantized by applying an error diffusion process, a quantization error generated when converting the pixel of interest into N-ary data is distributed to pixels (to be referred to as neighboring pixels around the pixel of interest hereinafter) around the pixel of interest that are processed after the pixel of interest. When the image forming unit forms an image based on image data having undergone the scan line changing process and interpolation process, the profile characteristic is canceled, and the image has a pixel arrangement close to one in original image data.

However, even if the image has a pixel arrangement close to one in original image data, the pixel arrangement is not completely the same, and a step of one line generated by the scan line changing process still remains. The interpolation process smooths this step, but only smooths the step by generating a density gradient. Hence, correction of more than one pixel at a scan line changing point and the error distribution do not match, and the mismatch appears as density unevenness or a texture, degrading the image quality.

SUMMARY OF THE INVENTION

The present invention has been made in consideration of the conventional situation, and has as its object to solve the above-described problems. More specifically, it is an object of the present invention to provide an image forming apparatus and image forming method for suppressing degradation of the image quality by distributing a quantization error in an error diffusion process in consideration of the profile of an image forming unit.

To achieve the above object, the present invention comprises the following arrangement. That is, an image forming apparatus which has an image forming unit for forming an image, comprises:

a storage configured to store profile information representing a shift amount of a scan line in a sub-scanning direction on an image carrier of the image forming unit in correspondence with a position in a scan line direction;

an error diffusion processing unit configured to perform an error diffusion process for image data; and a registration error correction unit configured to shift, for each pixel in the sub-scanning direction, a position of each pixel of the image data quantized by the error diffusion processing unit, on the basis of the profile information so as to cancel the shift amount of the scan line in the sub-scanning direction on the image carrier of the image forming unit, wherein the error diffusion processing unit diffuses an error on the basis of the profile information at distributions different between a predetermined second area including a position where the image data is shifted in the sub-scanning direction, and a remaining first area.

According to another aspect of the present invention, an image forming apparatus which has an image forming unit for forming an image, comprises:

a storage configured to store profile information representing a shift amount of a scan line in a sub-scanning direction on an image carrier of the image forming unit in correspondence with a position in a scan line direction;

a registration error correction unit configured to shift, for each pixel in the sub-scanning direction, a position of each pixel of image data to be processed on the basis of the profile information so as to cancel the shift amount of the scan line in the sub-scanning direction on the image carrier of the image forming unit; and an error diffusion processing unit configured to perform an error diffusion process for the image data processed by the registration error correction unit, wherein the error diffusion processing unit diffuses an error on the basis of the profile information at distributions different between a predetermined second area including a position where the image data is shifted in the sub-scanning direction, and a remaining first area.

The present invention can correct the registration error between color planes by forming an image so as to cancel the profile characteristic of an image forming apparatus. Further, the present invention can reduce degradation of the image quality such as density unevenness or a texture generated by performing a registration error correction process for a continuous tone image.

Further features of the present invention will become apparent from the following description of exemplary embodiments with reference to the attached drawings.

BRIEF DESCRIPTION OF THE DRAWINGS

FIGS. 5A to 5I are views showing an interpolation method in the correction direction at a scan line changing point;

FIGS. 9A to 9C are views showing a profile holding form;

FIG. 12 is a graph showing the correlation between the profile of the image forming section and correction of more than one pixel;

FIGS. 13A to 13F are views showing error diffusion matrices and error distributions in the first embodiment of the present invention;

FIGS. 18A to 18F are views for explaining an interpolation process.

DESCRIPTION OF THE EMBODIMENTS

First Embodiment

The first embodiment of the present invention will be described with reference to the accompanying drawings. In the first embodiment, a shift of an actual scan line from an ideal scan line which should be originally formed by scanning the surface of a photosensitive drum with a laser beam, i.e., from a scan line parallel to the rotating shaft of the photosensitive drum is canceled by shifting dot image data by the same amount in an opposite direction. Image degradation such as unevenness generated upon registration error correction is prevented. In addition, image degradation caused by performing a dither process for dot image data after registration error correction is also prevented.

An example of the structure of a laser beam printer as an example of an image forming apparatus applicable as an embodiment of the present invention, and an image correction method executed by the laser printer will be explained. The embodiment is applicable not only to the laser beam printer, but also to another type of output apparatus such as an inkjet printer or MFP (Multi Function Printer/Multi Function Peripheral). However, a printer to which the present invention can be effectively applied is one which comprises image forming units for respective color components and therefore may suffer a registration error between images of the respective color components. The registration error may occur when the inkjet printer is a serial printer in which printheads for respective color components are mounted in independent carriages, or a line head printer in which printheads for respective color components are independently attachable. By applying the embodiment of the present invention to these printers, the image quality improves. However, a tandem type color laser printer is highly likely to have a difference in scan line profile between color components, so the embodiment will exemplify the tandem type color laser printer.

Image Forming Section of Tandem Color LBP

Figure 4:
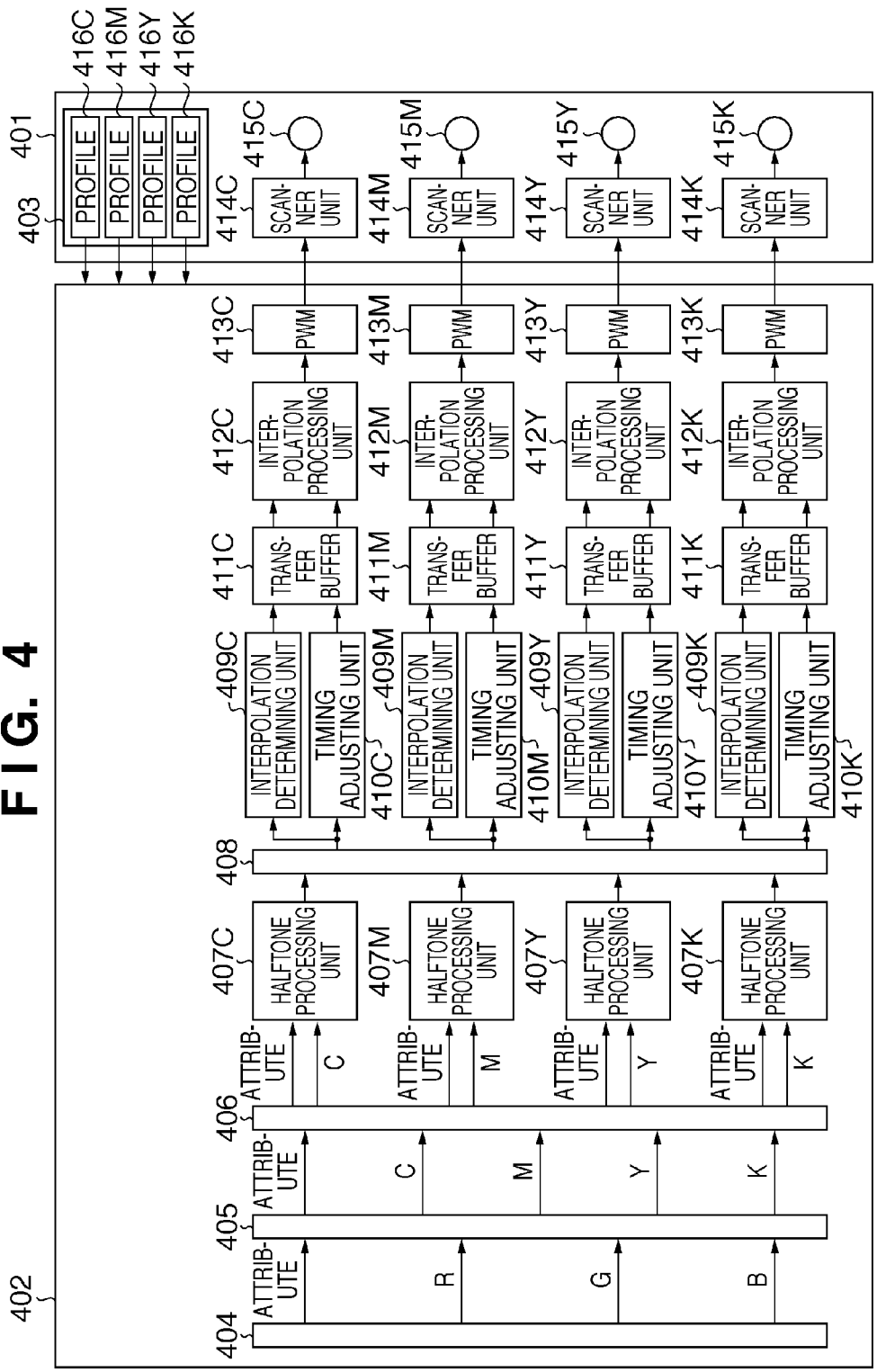
FIG. 4 is a block diagram showing the internal arrangement of the image forming apparatus according to the present invention.
Figure 6A:
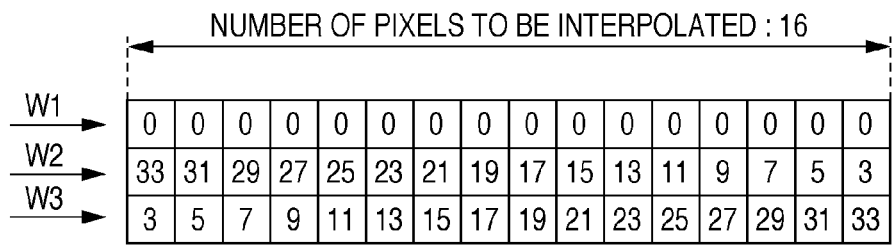
FIGS. 6A to 6D are views showing examples of the arrangement of interpolation coefficients.
Figure 6B:
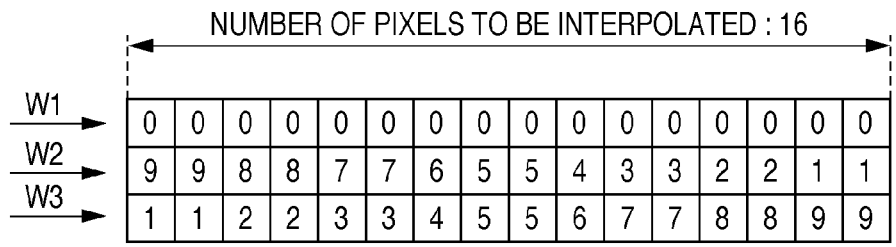
Figure 6C:
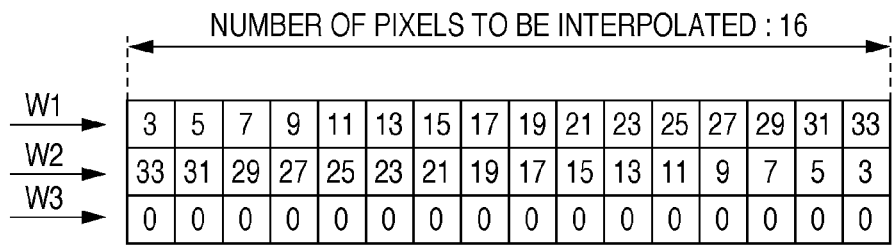
Figure 6D:
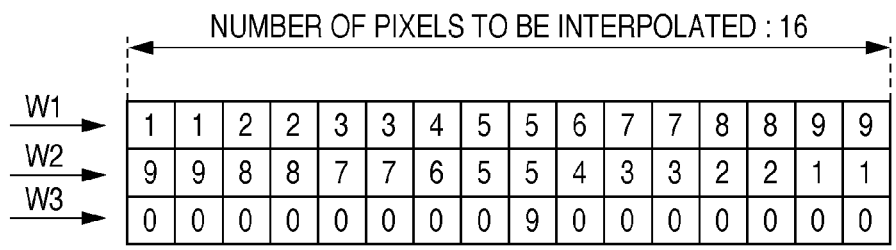

FIG. 4 is a block diagram for explaining the arrangements of blocks associated with formation of an electrostatic latent image in an electrophotographic color image forming apparatus according to the first embodiment. The color image forming apparatus comprises a color image forming section 401 and image processing section 402. The image processing section 402 generates bitmap image information, and the color image forming section 401 forms an image on a print medium on the basis of the bitmap image information. The image processing section 402 also performs a correction process such as registration error correction by referring to pieces of profile information 416C, 416M, 416Y, and 416K which are measured in advance and stored in a profile storage unit 403 for image forming units of respective color components. In the following description, building components denoted by reference numerals with color symbols "C", "M", "Y", and "K" for respective color components are sometimes generically named by reference numerals without these color symbols. The image forming unit is the name of a unit which includes a scanner unit 414 and printing unit 415 and forms a single-color image for each color component. The printing unit 415 is a unit which includes a photosensitive drum, transfer drum, and the like and forms a toner image. The printing unit 415 also forms images in addition to characters. Profile information represents a shift amount of a scan line in the sub-scanning direction on the image carrier of the image forming unit in correspondence with the position in the scan line direction.

Figure 2:
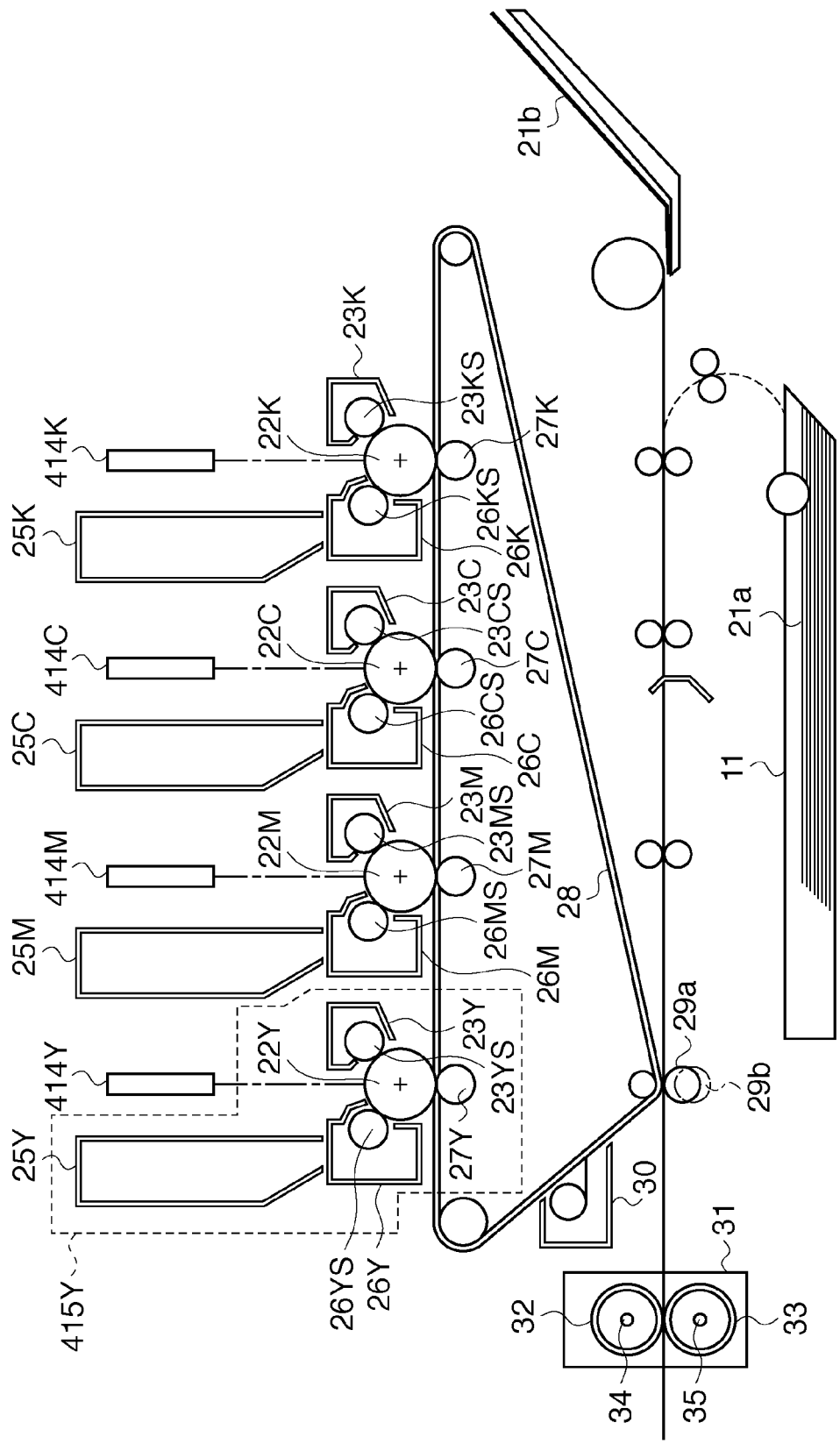
FIG. 2 is a sectional view showing the structure of an electrophotographic color image forming apparatus.

FIG. 2 is a sectional view of the tandem type color image forming section 401 adopting an intermediate transfer member 28 as an example of the electrophotographic color image forming apparatus. The operation of the color image forming section 401 in the electrophotographic color image forming apparatus will be explained with reference to FIG. 2. The color image forming section 401 drives exposure light in accordance with an exposure time processed by the image processing section 402, forming an electrostatic latent image on the photosensitive drum, i.e., image carrier. The color image forming section 401 develops the electrostatic latent image to form a single-color toner image of each color component. The color image forming section 401 composites single-color toner images on the intermediate transfer member 28 to form a multi-color toner image. The color image forming section 401 transfers the multi-color toner image to a print medium 11, and thermally fixes it. The intermediate transfer member also serves as an image carrier. The charging means comprises four injection chargers 23Y, 23M, 23C, and 23K for charging photosensitive bodies 22Y, 22M, 22C, and 22K for Y, M, C, and K. The injection chargers incorporate sleeves 23YS, 23MS, 23CS, and 23KS.

Driving motors rotate the image carriers, i.e., photosensitive bodies (photosensitive drums) 22Y, 22M, 22C, and 22K counterclockwise in accordance with the image forming operation. The scanner units 414Y, 414M, 414C, and 414K serving as exposure means irradiate the photosensitive bodies 22Y, 22M, 22C, and 22K with exposure light, selectively exposing the surfaces of the photosensitive bodies 22Y, 22M, 22C, and 22K. As a result, electrostatic latent images are formed on the surfaces of the photosensitive bodies. Developing units 26Y, 26M, 26C, and 26K serving as developing means develop the electrostatic latent images with Y, M, C, and K toners supplied from toner cartridge 25Y, 25M, 25C, and 25K in order to visualize the electrostatic latent images. The developing units incorporate sleeves 26YS, 26MS, 26CS, and 26KS. Each developing unit 26 is detachable. Each scanner unit can express the tone of each pixel, e.g., 16 tone levels in accordance with the width and intensity of a laser beam.

Primary transfer rollers 27Y, 27M, 27C, and 27K serving as transfer means press the intermediate transfer member 28 rotating clockwise against the photosensitive bodies 22Y, 22M, 22C, and 22K, transferring the toner images on the photosensitive bodies to the intermediate transfer member 28.

A single-color toner image is efficiently transferred onto the intermediate transfer member 28 by applying a proper bias voltage to the primary transfer roller 27, and making the rotational speed of the photosensitive body 22 different from that of the intermediate transfer member 28. This transfer is called primary transfer.

A multi-color toner image obtained by compositing single-color toner images of stations (which mean the image forming units of the respective color components) is conveyed to a secondary transfer roller 29 as the intermediate transfer member 28 rotates. The multi-color toner image on the intermediate transfer member 28 is transferred onto the print medium 11 which is conveyed from a paper feed tray 21a or 21b to the secondary transfer roller 29 while being clamped. A proper bias voltage is applied to the secondary transfer roller 29 to electrostatically transfer the toner image. This transfer is called secondary transfer. While transferring the multi-color toner image onto the print medium 11, the secondary transfer roller 29 abuts against the print medium 11 at a position 29a, and moves apart from the print medium 11 to a position 29b after printing.

A fixing unit 31 comprises a fixing roller 32 for heating the print medium 11, and a press roller 33 for pressing the print medium 11 against the fixing roller 32, in order to fuse and fix, on the print medium 11, a multi-color toner image transferred on the print medium 11. The fixing roller 32 and press roller 33 are hollow and incorporate heaters 34 and 35, respectively. The fixing unit 31 conveys the print medium 11 bearing the multi-color toner image by the fixing roller 32 and press roller 33, and applies heat and a pressure to fix the toner to the print medium 11.

The toner-fixed print medium 11 is discharged by discharge rollers (not shown) onto a delivery tray (not shown), ending the image forming operation. A cleaning unit 30 cleans off toner left on the intermediate transfer member 28. Waste toner left after transferring four color toner images formed on the intermediate transfer member 28 to the print medium 11 is stored in a cleaner vessel. As described above, the tandem color LBP comprises the image forming units including the printing units 415 and scanner units 414 for the respective color components. In FIG. 2, regarding the scanner units 414, scanner units 414Y, 414M, 414C and 414K are shown for respective color components. Regarding the printing units 415, only printing unit 415Y for yellow is exemplarily illustrated.

Profile Characteristic of Scan Line

Figure 3A:
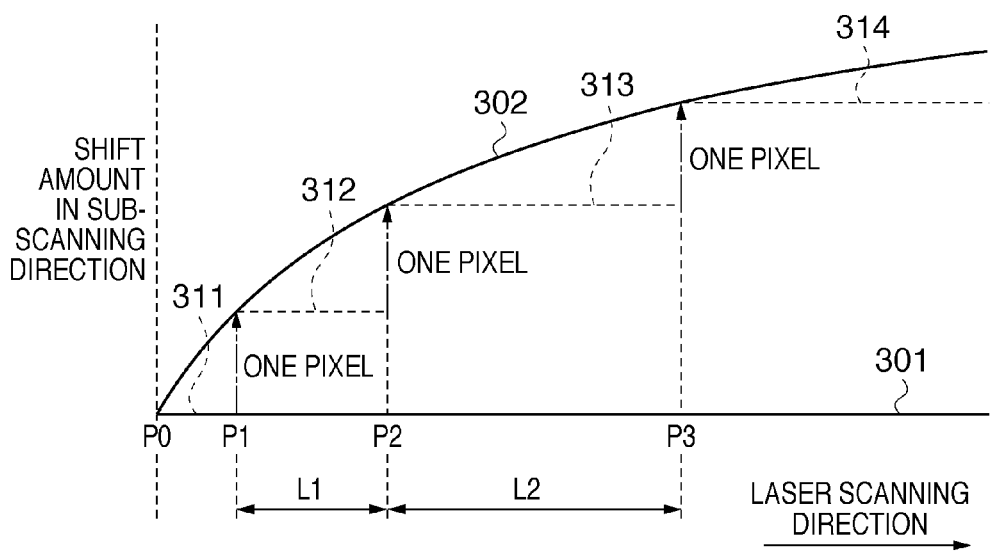
FIGS. 3A and 3B are graphs showing the profile characteristics of a scan line for each color in the image forming apparatus.
Figure 3B:
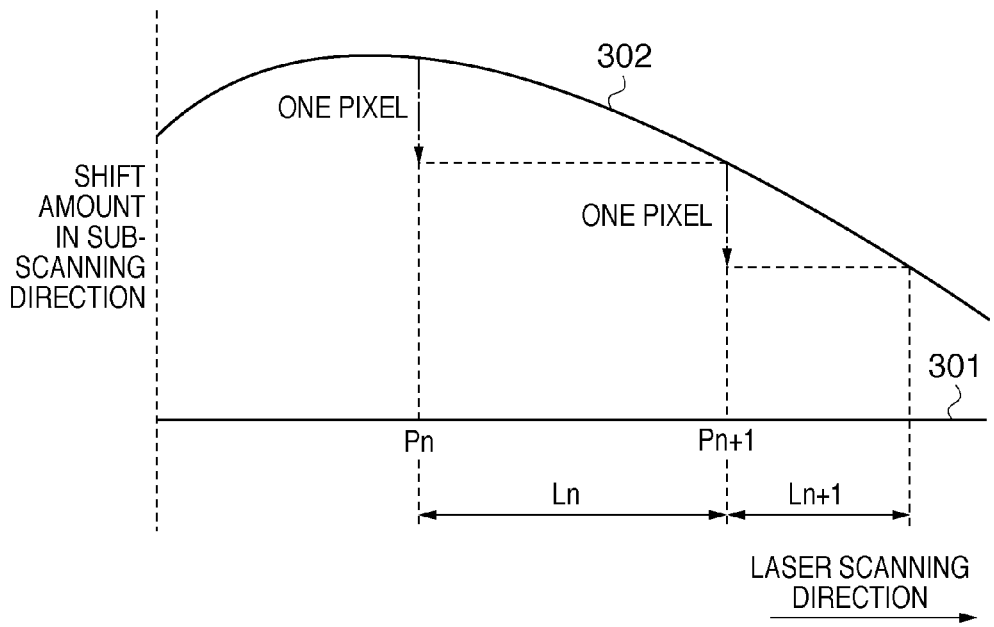

The profile characteristic of an actual scan line 302 for each color in the image forming apparatus will be explained with reference to FIGS. 3A and 3B. In FIGS. 3A and 3B, the scan line 302 represents an actual scan line which inclines or skews owing to the positional precision and eccentricity of the photosensitive body 22, and the positional precisions of the optical systems in the scanner units 414, i.e., 414C, 414M, 414Y, and 414K shown in FIG. 2. The image forming apparatus has a different profile characteristic for each printing device (printing engine). In a color image forming apparatus, the profile characteristic is different between colors.

FIG. 3A is a graph showing part of the profile characteristic of the image forming apparatus, and shows an area where the profile characteristic shifts upward in the sub-scanning direction. FIG. 3B shows an area where the profile characteristic shifts downward in the sub-scanning direction. An abscissa axis 301 represents an ideal scan line, and shows a characteristic when the photosensitive body 22 is scanned perpendicularly to the rotational direction of the photosensitive body 22, i.e., scanned parallel to the rotating shaft. The profile is expressed by a graph in FIGS. 3A and 3B, but a profile held in the profile information 416 is discrete data. For example, every time an actual scan line moves apart from or close to an ideal scan line by one pixel from a scan line start position P0, the position and the moving direction representing whether the actual scan line moves apart from or close to an ideal scan line are stored in association with each other. The position suffices to specify the ordinal number of a pixel in the scan line direction. Hence, the profile 302 is approximated by line segments 311, 312, 313, and 314 in profile information, which is sufficient for registration error correction.

In the following description, the profile characteristic assumes a direction in which the image processing section 402 corrects the profile characteristic. However, this representation is merely an example, and any representation can be adopted as long as the shift amount and direction can be uniquely specified. For example, it is possible to define the profile characteristic as the shift direction in the color image forming section 401 and correct the characteristic in the opposite direction by the image processing section 402.

Figure 7A:
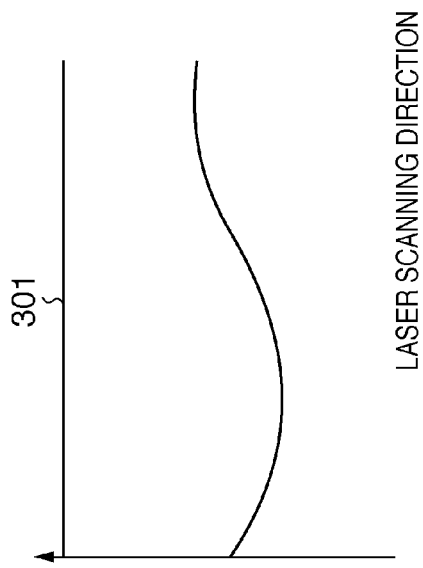
FIGS. 7A to 7D are graphs showing the profiles of an image processing section and image forming section.
Figure 7B:
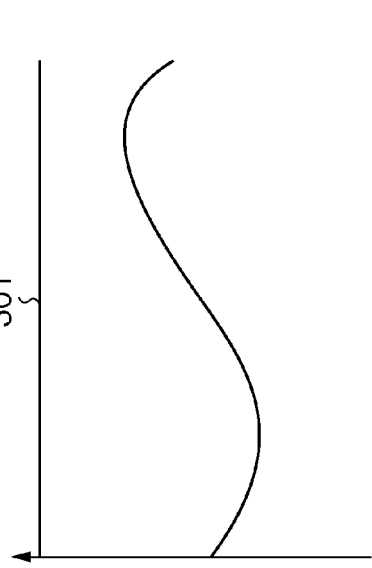
Figure 7C:
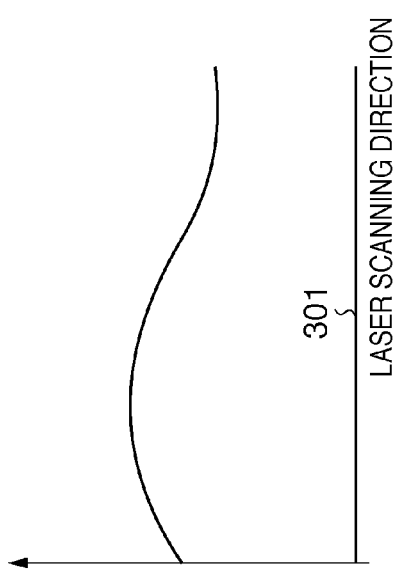
Figure 7D:
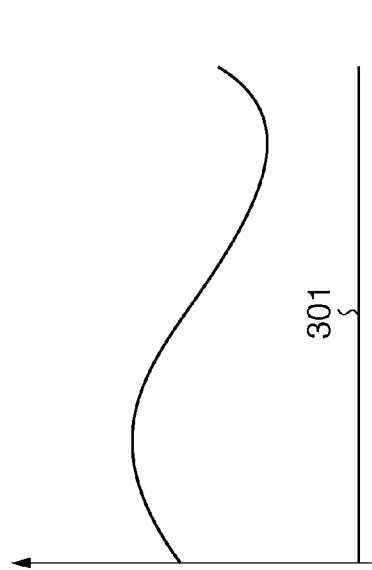

FIGS. 7A to 7D show the correlation between the direction in which the image processing section 402 performs correction, and the shift direction of the scan line in the color image forming section 401 on the basis of the profile definition. When the profile characteristic of the color image forming section 401 is given as shown in FIG. 7A, the image processing section 402 shifts image data in an opposite direction in the sub-scanning direction, as shown in FIG. 7B. When the profile characteristic of the color image forming section 401 is given as shown in FIG. 7C, the image processing section 402 shifts image data in the sub-scanning direction, as shown in FIG. 7D. Note that the shift amount is measured using the ideal scan line 301 as a reference.

Profile characteristic data (profile information) includes the pixel position of a scan line changing point in the main scanning direction, and the direction of change of the scan line to the next scan line changing point, as shown in FIGS. 9A to 9C. More specifically, scan line changing points P1, P2, P3, . . . , Pm are defined for the profile characteristic in FIG. 9A. Each scan line changing point is defined as a point where the scan line shifts by one pixel in the sub-scanning direction. As the direction, the scan line shifts upward or downward in a section till the next scan line changing point. For example, at the scan line changing point P2, the scan line shifts upward by one line in FIG. 9A. That is, at the scan line changing point P2, image data changes to a line immediately below the current line. The shift direction at the point P2 is "upward (↑)", as shown in FIG. 9B. In the image process, image data changes to a lower line. Similarly at the point P3, the shift direction is "upward (↑)". The shift direction in the sub-scanning direction at the scan line changing point P4 is "downward (↓)", unlike the preceding direction. Data on the direction is held as, for example, "1" representing the upward direction, or "0" representing the downward direction, as shown in FIG. 9C. In this case, the amount of held data corresponds to bits equal in number to scan line changing points. If the number of scan line changing points is m, the number of held bits is also m. The scan line changing process can be regarded as a process to reconnect the line of interest to an upper or lower line at a scan line changing point.

Scan Line Changing Point

The scan line changing point of an area where the scan line shifts upward in the laser scanning direction will be explained with reference to FIG. 3A. The scan line changing point in the embodiment is a point where the scan line shifts by one pixel in the sub-scanning direction. In FIG. 3A, points P1, P2, and P3 where the upward skew characteristic 302 shifts by one pixel in the sub-scanning direction are scan line changing points. In FIG. 3A, the points P1, P2, and P3 are plotted using P0 as a reference. As is apparent from FIG. 3A, the distance between scan line changing points is short in an area where the skew characteristic 302 changes abruptly, and long in an area where it changes gradually, as represented by distances L1 and L2.

The scan line changing point of an area where the scan line shifts downward in the laser scanning direction will be explained with reference to FIG. 3B. Also in an area representing a downwardly shifted characteristic, the scan line changing point is defined as a point where the scan line shifts by one pixel in the sub-scanning direction. In FIG. 3B, points Pn and Pn+1 where the downward skew characteristic 302 shifts by one pixel in the sub-scanning direction are scan line changing points. Also in FIG. 3B, similar to FIG. 3A, the distance between scan line changing points is short in an area where the skew characteristic 302 changes abruptly, and long in an area where it changes gradually, as represented by distances Ln and Ln+1.

As described above, the scan line changing point is closely related to the degree of change of the skew characteristic 302 of the image forming apparatus. The number of scan line changing points is large in an image forming apparatus having a steep skew characteristic, and small in an image forming apparatus having a gradual skew characteristic.

If the skew characteristic of the image forming unit is different between colors, the number and positions of scan line changing points are also different. The difference in scan line profile between colors appears as a registration error in an image obtained by transferring toner images of all colors onto the intermediate transfer member 28. The present invention is directed to a process at the scan line changing point.

Image Processing Section of Tandem Color LBP

The image processing section 402 in the color image forming apparatus will be explained with reference to FIG. 4. An image generation unit 404 generates raster image data capable of a printing process from print data received from a computer or the like (not shown), and outputs the raster image data for each pixel as R, G, and B data and attribute data representing the data attribute of each pixel. The image generation unit 404 may also be configured to arrange a reading means in the color image forming apparatus and process image data from the reading means instead of image data received from a computer or the like. A color conversion unit 405 converts R, G, and B data into C, M, Y, and K data in accordance with the toner colors of the color image forming section 401, and stores the C, M, Y, and K data and attribute data in a storage unit 406. The storage unit 406 is the first storage unit arranged in the image processing section 402, and temporarily stores dot image data subjected to a printing process. The storage unit 406 may also be formed from a page memory which stores dot image data of one page, or a band memory which stores data of lines. Dot image data is also called raster image data.

Halftone processing units 407C, 407M, 407Y, and 407K perform a halftone process for attribute data and data of the respective colors output from the storage unit 406. As concrete arrangements of the halftone processing unit, there are a halftone processing unit which performs a screen process, and a halftone processing unit which performs an error diffusion process. The screen process is to perform an N-ary process using predetermined dither matrices and input image data. The error diffusion process is to perform an N-ary process by comparing input image data with a predetermined threshold, and diffuse the difference between the input image data and the threshold to peripheral pixels subjected to the N-ary process later. The first embodiment executes the error diffusion process. In the first embodiment, N=2, but the number of bits per pixel is four. That is, a pixel value is converted into 0 or 15 by a quantization process.

A second storage unit 408 is incorporated in the image forming apparatus, and stores N-ary data processed by the halftone processing units 407, i.e., 407C, 407M, 407Y, and 407K. If the position of a pixel subjected to an image process by processing blocks on the downstream side of the second storage unit 408 is a scan line changing point, scan line changing of one line is executed when reading out data from the second storage unit 408. More specifically, the address of a dot to be read out proceeds not to the next dot but further by one line from the next dot, or returns by one line. Whether to proceed or return the address by one line is determined in accordance with the shift direction.

Figure 8A:
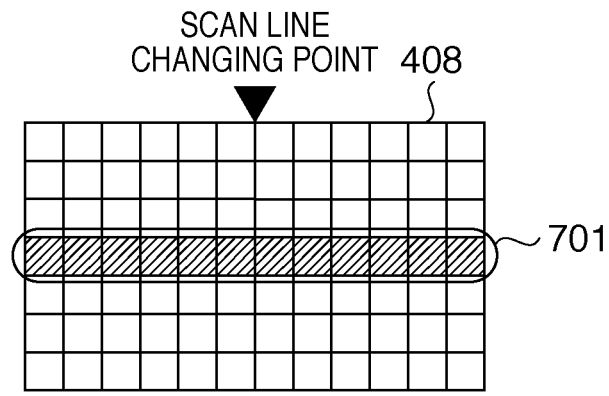
FIGS. 8A to 8C are views showing the difference of the arrangement depending on the correction process direction at a scan line changing point.
Figure 8B:
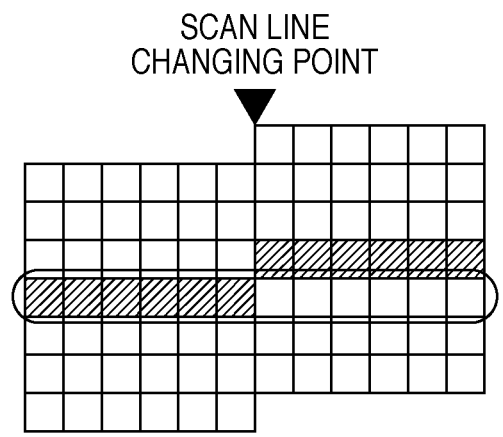
Figure 8C:
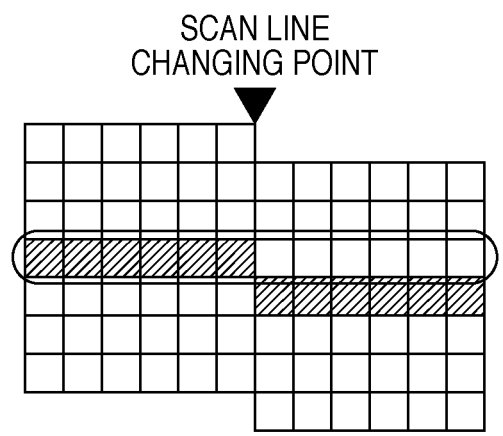

FIG. 8A is a view schematically showing the state of data held in the storage unit 408 of FIG. 4. As shown in FIG. 8A, the storage unit 408 stores data processed by the halftone processing unit 407 regardless of the correction direction of the image processing section 402 or the skew characteristic of the scan line in the color image forming section 401. If the direction in which the image processing section 402 performs correction is downward, i.e., the profile characteristic is downward, image data is shifted upward by one pixel at a scan line changing point serving as a boundary, as shown in FIG. 8B, when reading out a line 701 in FIG. 8A. If the direction in which the image processing section 402 performs correction is upward, i.e., the profile characteristic is upward, image data is shifted downward by one pixel at a scan line changing point serving as a boundary, as shown in FIG. 8C, when reading out image data of the line 701 from the storage unit 408.

Interpolation determining units 409C, 409M, 409Y, and 409K for the respective colors determine whether or not the pixel requires interpolation later as a process for pixels before and after a scan line changing point in input N-ary data. Timing adjusting units 410C, 410M, 410Y, and 410K synchronize N-ary data read out from the storage unit 408 with the determination results of the interpolation determining units 409. Transfer buffers 411C, 411M, 411Y, and 411K temporarily hold data output from the interpolation determining units 409 and timing adjusting units 410. In this description, the first storage unit 406, second storage unit 408, and transfer buffer 411 are separately arranged, but a common storage unit may also be arranged in the image forming apparatus.

Interpolation processing units 412C, 412M, 412Y, and 412K interpolate data received from the transfer buffers 411 on the basis of the determination results of the interpolation determining units 409 that are also transferred from the transfer buffers. Although the determination result from the interpolation determining unit 409 is the result of determination of each pixel, the interpolation process by the interpolation processing unit 412 uses pixels before and after a scan line changing point corresponding to the profile (skew characteristic) of the image forming apparatus. FIGS. 5A to 5I show an interpolation method at a scan line changing point (FIGS. 5A to 5I will be referred to as FIG. 5 at once).

Interpolation Process

FIG. 5A is a graph showing the skew characteristic of the scan line of the image forming apparatus in the laser scanning direction. Area 1 (first area) is an area where the image processing section 402 needs to perform correction downward. To the contrary, area 2 (second area) is an area where the image processing section 402 needs to perform correction upward. For descriptive convenience, the minimum interval between scan line changing points is 16 pixels in the following description of the interpolation process, but the present invention is not limited to this. The interval may also be set to an arbitrary number of pixels, or the power of two in order to reduce the circuit arrangement. Interpolation, i.e., smoothing to be described later is done for 16 pixels immediately before a scan line changing point in the main scanning direction. If the interval between scan line changing points is longer than 16 pixels, pixels preceding to (on the left side in FIG. 5) the smoothed area remain without being smoothed. The interval is set to 16 pixels because one binary pixel is represented by four bits in this example and can also be represented by 16 tone levels in accordance with the tone expression capability of the image forming unit. A step between lines can be smoothed by changing the density by one tone level for one pixel value.

FIG. 5B shows images before and after a scan line changing point Pc before the scan line changing process, i.e., shows output image data 502 from the halftone processing unit 407 in the example of FIG. 5A. The line of interest is the center line of 3-line image data shown in FIG. 5B. FIG. 5C shows the arrangement of data 503 after the scan line changing process of one pixel when paying attention to the line of interest, i.e., the arrangement of image data output from the storage unit 408. Since the scan line changing process is performed when reading out image data from the storage unit 408, the arrangement of pixels before and after the scan line changing point Pc when inputting image data to the interpolation processing unit 412 has a step of one line at the scan line changing point Pc serving as a boundary.

The interpolation processing unit 412 executes the interpolation process for image data appearing as a step on the line of interest. Since the correction direction in area 1 is upward, the line of interest is interpolated by weighting image data of a succeeding line. Weighting in this description is to adjust the sum of two target pixels in the sub-scanning direction to 16 in accordance with the minimum value of the scan line changing point, as shown in FIG. 5D. However, this is merely an example, and the sum of pixel values is not limited to 16. The sum of pixel values may also be set to the power of two in order to reduce the circuit used for calculation, or an arbitrary coefficient may also be used for calculation in order to increase the precision. As the weighting calculation, the weighting coefficient may also be changed for each pixel, which will be described later. Alternatively, a common weighting coefficient may also be used for a plurality of pixels, as shown in FIGS. 6A to 6D. Further, the number of corresponding pixels may also be changed depending on the value of the weighting coefficient. The scan line changing point is defined as a position on the main scan line where the scan line shifts by one pixel in the sub-scanning direction. In the following description, the reference position in interpolation is set to the start point of main scanning, i.e., the left end. Equation (1) is used for interpolation, wherein x represents the position of the pixel of interest in the main scanning direction, and y represents the position of the pixel of interest in the sub-scanning direction. Letting p be a pixel value and p' be a corrected pixel value, equation (1) is $$p'(x,y) = w1 \times p(x,y-1) + w2 \times p(x,y) + w3 \times p(x,y+1) \quad (1)$$

where w1, w2, and w3 are weighting coefficients having the same x-coordinate and are defined by a coefficient matrix of 3×16 pixels in this example, as shown in FIG. 5D. The coefficient matrix in FIG. 5D is used to shift image data to an upper line at a scan line changing point. All coefficients on a line immediately above the line of interest are 0. The coefficient value on the line of interest (center line in FIG. 5D) is decremented by 1/16 from 15/16 to 0/16 (the denominator is not shown in FIG. 5D) every time the pixel of interest moves to the right by one pixel. The coefficient value on a line immediately below the line of interest is incremented by 1/16 from 1/16 to 16/16 every time the pixel of interest moves to the right by one pixel. This coefficient matrix corresponds to 3×16 pixels centered on the line of interest immediately before (on the right side) the scan line changing point, and corrected pixel values are obtained in accordance with equation (1). The corrected pixel values replace pixel values before correction. This process is done by paying attention to all lines of image data to be processed. Equation (1) represents the value of the pixel of interest by the weighted average of the value of the pixel of interest and the values of corresponding pixels on upper and lower lines.

FIG. 5E is a conceptual view of interpolated pixel values obtained by applying equation (1) to image data in FIG. 5B. As for pixels before the scan line changing point Pc, as the pixel is closer to the scan line changing point Pc, it is more strongly influenced by a pixel value on a succeeding line by the interpolation of equation (1). As the pixel (pixel on the left side) is farther from the scan line changing point Pc, it is more strongly influenced by the line of interest, i.e., black data line.

As for pixels after the scan line changing point Pc, as the pixel is closer to the scan line changing point Pc, it is more strongly influenced by image data on a line preceding to the line of interest. As the pixel is farther from the scan line changing point Pc, it is more strongly influenced by a line succeeding to the line of interest. The line preceding to the line of interest is a previous line of interest which becomes a preceding line of data owing to a scan line changing process step larger than one pixel. In this example, pixels other than 16 pixels immediately before the scan line changing point do not undergo the interpolation process, so their image data are not smoothed.

Area 1 where correction needs to be performed downward will be explained. When performing correction downward, weighting coefficients used to calculate corrected pixel values are set on the line of interest and a line preceding to it.

FIG. 5F shows image data output from the halftone processing unit 407. FIG. 5G shows an example of image data read out from the storage unit 408. Since downward correction is done at a scan line changing point Pa, a scan line changing process step larger than one pixel appears at the scan line changing point Pa serving as a boundary, as shown in FIG. 5G. The values W1, W2, and W3 when performing downward correction are those shown in FIG. 5H. For descriptive convenience, the sum of weighting coefficients is set to 16, similar to the upward correction process. By applying equation (1) to even downward correction, corrected pixel values are obtained using the scan line changing point Pa as a boundary. Before the scan line changing point Pa, as the pixel is closer to the scan line changing point, it is more strongly influenced by a pixel value on a preceding line. As the pixel is farther from the scan line changing point Pa, it is more strongly influenced by the line of interest. As for pixels after the scan line changing point Pa, as the pixel is closer to the scan line changing point Pa, it is more strongly influenced by the line of interest. As the pixel is farther from the scan line changing point Pa, it is more strongly influenced by a line preceding to the line of interest (FIG. 5I). In this example, the interpolation process targets 16 pixels before the scan line changing point. In FIG. 5I, the interval between the scan line changing points Pa and Pb is 16 pixels, so image data seem to be smoothed before and after the scan line changing point Pa. However, when the interval is larger than 16 pixels, image data are not smoothed immediately after the scan line changing point Pa.

In this way, a large step is prevented from appearing in pixel data successive in the main scanning direction owing to a scan line changing process step larger than one pixel in the interpolation process by the interpolation processing unit 412 regardless of whether the correction direction is upward or downward.

PWMs (Pulse Width Modulators) 413C, 413M, 413Y, and 413K convert image data of the respective colors output from the interpolation processing units 412C, 412M, 412Y, and 412K into the exposure times of the scanner units 414C, 414M, 414Y, and 414K. The printing units 415C, 415M, 415Y, and 415K of the image forming section 401 output the converted image data. Profile characteristic data are held in the image forming section 401 as the characteristics of the image forming apparatus (the profiles 416C, 416M, 416Y, and 416K). The image processing section 402 executes a scan line changing process and interpolation process in accordance with the profile characteristics held in the image forming section 401.

Error Diffusion Process

Figure 1:
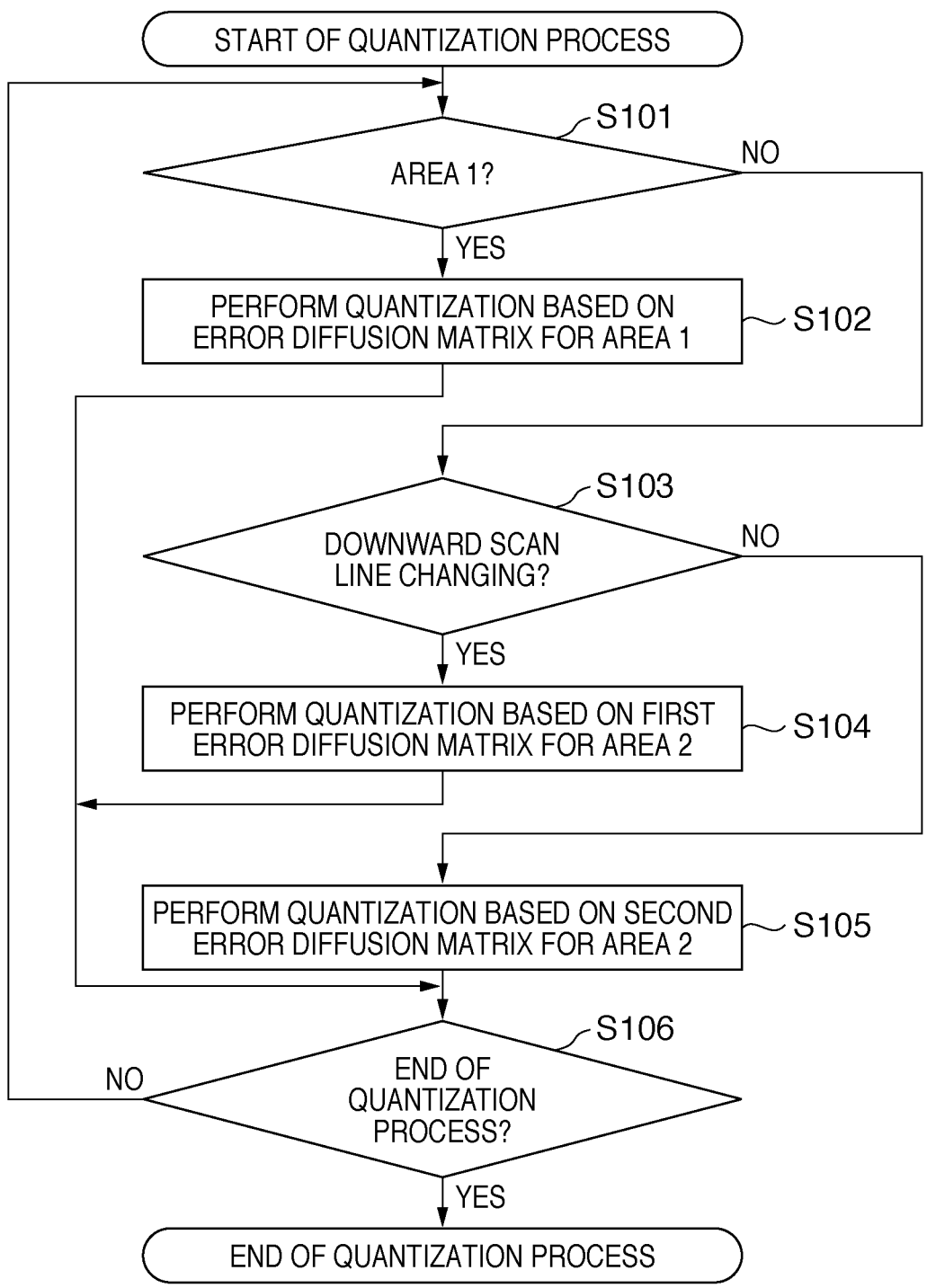
FIG. 1 is a flowchart showing a process sequence in image formation according to the present invention.
Figure 10A:
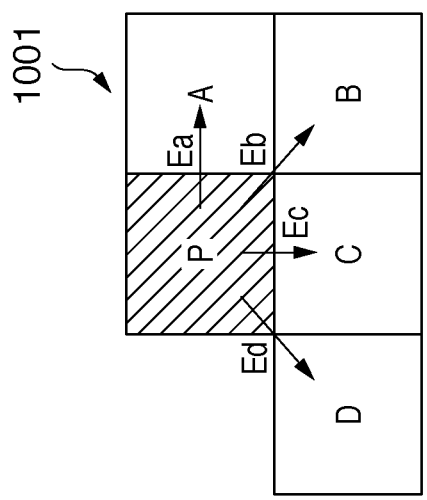
FIGS. 10A and 10B are views showing matrix structures in an error diffusion process.
Figure 10B:
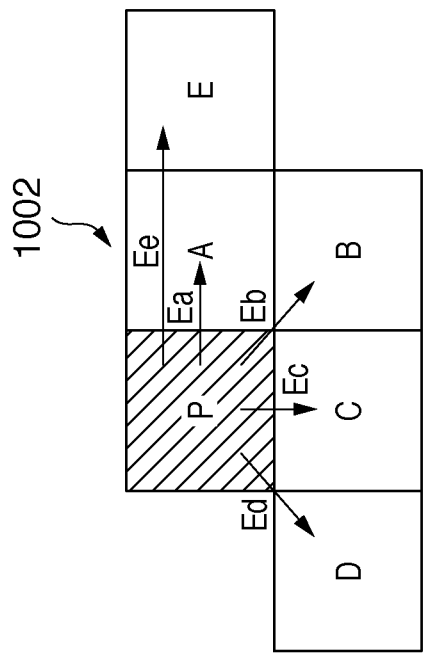

The most characteristic part of the present invention will be described in more detail with reference to FIG. 1 and the like. The embodiment of the present invention employs an error diffusion method as the processing method of the halftone processing unit 407 described above. FIGS. 10A and 10B show the contents of an image process by the error diffusion method. FIG. 10A shows the structure of an error diffusion matrix 1001 when the number of adjacent pixels to which the quantization error of a pixel P of interest is distributed is four (A, B, C, and D). As shown in FIG. 10A, in image formation by the error diffusion method, the value of the pixel P of interest is compared with a predetermined threshold Th, and output image data are obtained respectively in a case where the value of the pixel P of interest exceeds the threshold Th as a result of comparison and a case where the value is smaller. The number of thresholds Th is one when binarizing input image data, and three when quadrupling it. That is, when performing an N-ary process, N−1 different thresholds are used. Assume that the value of the 8-bit pixel P of interest is binarized by the threshold Th. In this case, a pixel value smaller than the threshold Th is converted into 0, and that larger than the threshold Th is converted into 1. A pixel value equal to the threshold Th suffices to be converted into 0 or 1. Since one pixel is made up of eight bits, a value "255" (=FF-hex) obtained by extending 1 into eight bits is adopted as a value after 8-bit binarization.

Assume that the value of the pixel P of interest is 200, and the threshold Th is 128. Since the value of the pixel P of interest exceeds the threshold Th, a value after quantizing the pixel of interest, i.e., an output value is 255. The difference between pixel values before and after quantization is distributed as a quantization error to neighboring pixels. In this example, the difference value "200−255=−55" between the value "200" of the pixel P of interest before quantization and the value "255" after quantization is distributed to pixels A, B, C, and D which are adjacent to the pixel P of interest and processed after the pixel of interest. At this time, the quantization error is prorated in accordance with predetermined weights. For example, when weighting coefficients Wa, Wb, Wc, and Wd of error distribution to adjacent pixels A, B, C, and D are set to 3/8, 2/8, 2/8, and 1/8, respectively, values distributed to the respective adjacent pixels are

| | |
|---|---|
| −55×3/8=−20 | adjacent pixel A |
| −55×2/8=−14 | adjacent pixel B |
| −55×2/8=−14 | adjacent pixel C |
| −55×1/8=−7 | adjacent pixel D |

These values are added to the respective pixel values. A value after quantization is represented by the number of bits corresponding to a subsequent process. In this example, an interpolation process to smooth steps at 16 levels is performed after the scan line changing process, so a binary value of 0 or 255 is converted into data of four bits/pixel represented by 0 or 15.

FIG. 10B shows the structure of another matrix 1002 as an error diffusion matrix in the error diffusion method. The matrix 1002 is different from the matrix 1001 in the positions of adjacent pixels to which the difference between the pixel P of interest and the threshold Th is distributed, and corresponding weighting coefficients.

Figure 11:
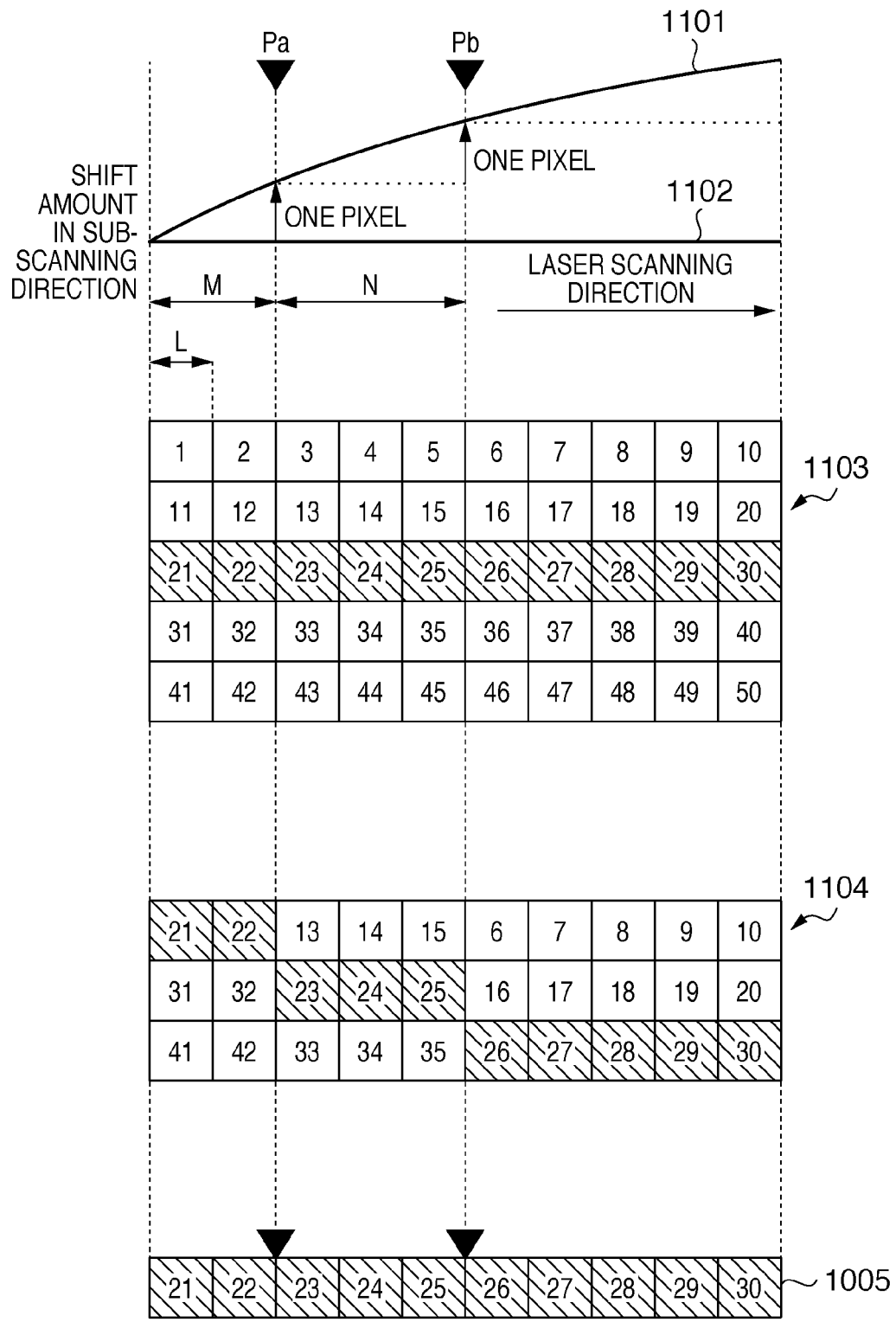
FIG. 11 is a view showing correction of more than one pixel in the first embodiment of the present invention.

A combination of image formation by the error diffusion method, and a correction process for more than one pixel at a scan line changing point will be explained with reference to FIG. 11. The top part of FIG. 11 shows a profile 1101 of a skew characteristic to be corrected by the image processing section 402, and scan line changing points Pa and Pb when the ordinate axis represents the sub-scanning shift amount and the abscissa axis represents the laser scanning direction. The profile 1101 represents a case where the correction direction at the scan line changing point is upward. When performing downward correction, the direction is reversed from that in upward correction.

In FIG. 11, Pa and Pb represent scan line changing points, and L represents the minimum pixel interval between scan line changing points. In the example of FIGS. 6A to 6D, 16 pixels correspond to L. At the scan line changing point Pa, an actual scan line shifts upward in the sub-scanning direction by one pixel from a reference line 1102. In the example of FIG. 11, the scan line changing point Pa is a position spaced apart from the scan line start position by double the minimum scan line changing point interval L (double the number of pixels). Similarly, the scan line changing point Pb is a point at which the scan line shifts upward in the sub-scanning direction by one pixel from the scan line changing point Pa, and which is a position spaced apart by triple the minimum line changing point interval L (triple the number of pixels).

Image data 1103 represents a state in which image data processed by the halftone processing unit 407 is stored in the storage unit 408. A portion represented by a figure is based on the number of pixels at the minimum interval between scan line changing points, and is a pixel array of L pixels in the main scanning direction, i.e., laser scanning direction. Image data output from the halftone processing unit 407 is image data before executing a registration error correction process, so no step is generated by scan line changing correction at the scan line changing points Pa and Pb serving as boundaries.

The profile 1101 indicates the correction direction of the image processing section 402 that corresponds to the skew characteristic of the scan line of the image forming section 401. The image data 1103 stored in the storage unit 408 is read out as image data 1104. More specifically, the profile 1101 shifts by one pixel at the scan line changing point Pa in the sub-scanning direction (upward in FIG. 11). Thus, M pixels from the scan line start position to the scan line changing point Pa, i.e., pixel array 21 and pixel array 22 of the image data 1103 are read out from the storage unit 408 without shifting them. Since the scan line shifts upward by one pixel in the sub-scanning direction, image data to be read out after image data 22 is pixel array 13 shifted upward in the sub-scanning direction. No shift of one pixel occurs in the sub-scanning direction till the next scan line changing point Pb. Hence, pixel arrays to be read out after pixel array 13 are pixel array 14 and pixel array 15. At the scan line changing point Pb after reading out N pixels from the scan line changing point Pa, data to be read out next is pixel array 6 shifted upward by one pixel in the sub-scanning direction. Subsequently, data are read out in the order of pixel array 7, pixel array 8, pixel array 9, . . . without shifting data in the sub-scanning direction till the next scan line changing point (not shown).

After data are read out from the storage unit 408 by the number of pixels in the main scanning direction, the next line, i.e., image data (pixel) 31 (not shown) is read out. Since the scan line changing point is based on the skew characteristic of the image forming section 401, the scan line changing points Pa and Pb do not vary regardless of a factor in the sub-scanning direction. Hence, image data are read out while being shifted in the sub-scanning direction at the same positions as those in the above-described process. That is, after reading out image data 31 and image data 32, image data is shifted upward in the sub-scanning direction to read out image data 23, image data 24, and image data 25. Then, at the scan line changing point Pb, image data 16, image data 17, image data 18, . . . are read out. This also applies to other lines.

The image data 1104 represents an example of image data read out in this fashion. Pixel arrays 21 to 30 shift to changed lines at the scan line changing points by the scan line changing process in readout. The image forming section 401 prints out the readout image data. Since the image forming section 401 has a skew characteristic as shown by the profile 1101, image data read out from the storage unit 408 are printed on a scan line skewed in accordance with the skew characteristic, and arranged on positions approximated to the original image data, like a printed pixel array 1105. That is, in readout, a line starting from image data 21 is read out discontinuously while being shifted upward in the sub-scanning direction at the scan line changing point Pa or Pb. On the printout result, however, the line starting from image data 21 is printed out continuously on almost the same line.

In image formation according to the error diffusion method, since the error between the pixel of interest and the threshold is distributed to pixels adjacent to the pixel of interest, this method impairs the image reproducibility near the scan line changing point. That is, the halftone process does not consider the scan line changing process at the scan line changing point, and even a pixel at the scan line changing point is processed using the same error diffusion matrix and error distribution as those for a pixel at a position other than the scan line changing point. As a result, an error occurs by the scan line changing process of reading out image data from the storage unit 408 while shifting it in the sub-scanning direction.

This will be explained in detail. For descriptive convenience of error diffusion, L=1 in FIG. 11. Needless to say, L can be larger than 1, but the error diffusion process is done for each pixel. The matrix 1001 in FIG. 10A is used as the coefficient matrix of error distribution.

At the scan line changing point Pa, a pixel to be read out after pixel 22 is pixel 13. However, the quantization error of pixel 22 is distributed to pixel 23, pixel 31, pixel 32, and pixel 33. Among the distributed errors, errors distributed to image data 23 and 33 over the scan line changing point in the main scanning direction have an adverse effect. This is because the scan line changing process shifts these pixels to positions different from pixel positions where the quantization error is to be distributed. Upon image formation, a shift in an image formed in accordance with the profile of the image forming section is reduced, but is not completely canceled.

That is, an image basically free from the skew characteristic is formed by reading out data from the storage unit 408 in the correction direction in accordance with the skew characteristic (profile) of the image forming section 401. This process is digital scan line changing of one pixel at a scan line changing point, and cannot cope with the analog (continuous: less than one pixel) skew characteristic of the image forming section 401. FIG. 12 shows the relationship between the skew characteristic of the image forming section 401 and correction by the image processing section 402. A line 1201 in FIG. 12 represents the skew characteristic of the image forming section 401. As shown in FIG. 12, the skew characteristic of the image forming section 401 changes not by one pixel, but continuously at positions in the main scanning direction. The skew characteristic shifts by one pixel at the scan line changing point Pa corresponding to the Mth pixel from the scan start point. In practice, the shift amount changes gradually over M pixels up to the scan line changing point Pa. Also, the skew characteristic shifts gradually over N pixels from the scan line changing point Pa, and shifts by one pixel in the sub-scanning direction at the scan line changing point Pb.

To the contrary, correction by the image processing section 402 in readout from the storage unit 408 is represented by a line 1202 in FIG. 12. That is, at the scan line changing point Pa, image data is shifted upward by one pixel in the sub-scanning direction (direction opposite to the skew characteristic of the image forming section 401), and then read out. For this reason, correction which accurately corresponds to a continuous change as represented by the line 1201 cannot be done.

According to conventional techniques, as a means for smoothing steps, an interpolation process of less than one pixel is performed at a scan line changing point. However, as described in Description of the Related Art, when the interpolation process is executed at a scan line changing point for continuous tone image data, it makes the density uneven, deteriorating an output image.

Error Diffusion Process Premised on Scan Line Changing Process

A measure against this problem in the first embodiment will be described. Especially when the error diffusion method is used to generate a continuous tone image, the first embodiment can improve the quality of an output image near a scan line changing point.

FIGS. 13A to 13C are views showing error diffusion matrices and error distributions when performing a scan line changing process (also called downward correction or downward scan line changing) to change the line of interest to a line below it at a scan line changing point by the image processing section 402. One square represents a pixel which forms image data.

In the first embodiment, as shown in FIGS. 13A to 13C, the image is divided into an area near a scan line changing point, and preceding and succeeding areas. This will be described by giving attention to one line. In the example of FIGS. 13A to 13C, area 2 made up of 10 pixels before a scan line changing point and three pixels after it, and the remaining area 1 are processed as separate areas. In this description, an area including no scan line changing point is defined as area 1, and an area including a scan line changing point is defined as area 2. The range of area 2 can also be set to one other than this example. In other words, preceding and succeeding pixels in area 2 including a scan line changing point can be set for each image forming apparatus. As for area 2, the numbers of preceding and succeeding pixels may also be set asymmetrically, as shown in FIGS. 13A to 13C, or symmetrically. In an extreme case, one pixel before (or after) a scan line changing point may also be set as pixels in area 2. That is, on a given line, area 2 where the error diffusion matrix is switched should include at least one pixel immediately before a scan line changing point. In any case, area 2 is defined in advance by the numbers of pixels before and after a scan line changing point serving as a reference.

When the line to which the line of interest changes is a line below the (hatched) line of interest, as shown in FIG. 13A, quantization is executed in area 1 using an error diffusion matrix a-1 shown in FIG. 13B. More specifically, the quantization process is done while distributing the quantization error of the shaded pixel P of interest to adjacent pixels by weighting calculation. An error Ea obtained by weighting calculation is distributed to adjacent pixel A, and an error Eb obtained by weighting calculation is distributed to adjacent pixel B. Similarly, an error Ec is distributed to adjacent pixel C, and an error Ed is distributed to adjacent pixel D.

In area 2, quantization is executed using an error diffusion matrix a-2 shown in FIG. 13C. In changing to a lower line, the shape of the error diffusion matrix a-2 may also be the same as that of the error diffusion matrix a-1. In this case, the error distribution to pixels A, B, C, and D adjacent to the pixel P of interest is different from the distribution in area 1. Since the scan line changing direction at the scan line changing point is downward, an error distributed to the next line is preferably larger than that in area 1 at the scan line changing point serving as a reference. This is because errors to be distributed to a pixel next to the pixel of interest and a pixel immediately below the next pixel in the scanning direction on the same line are distributed to an upper right pixel with respect to the pixel of interest and a pixel immediately below the upper right pixel as a result of the scan line changing process.

In area 2, therefore, errors distributed to pixels A, B, C, and D adjacent to the pixel P of interest are set to Ea', Eb', Ec', and Ed' while setting Ea>Ea' and Eb<Eb'. By switching the error distribution, even when correction of more than one line is done in readout from the storage unit 408, an unnatural step before and after the scan line changing point is reduced. Errors are set to Ea>Ea' and Eb<Eb' in order to increase the ratio of an error distributed to a pixel close to the pixel of interest at a scan line changing point in the scan line changing process so as not to lose color continuity between pixels. Ec' and Ed' may also be equal to Ec and Ed. As a result, a pixel array including pixels before and after a scan line changing point comes close to an ideal scan line in accordance with the profile characteristic, but a step between pixels before and after the scan line changing point upon scan line changing still remains. However, discontinuity owing to this step can be reduced to prevent degradation of the image quality.

Figure 13D:
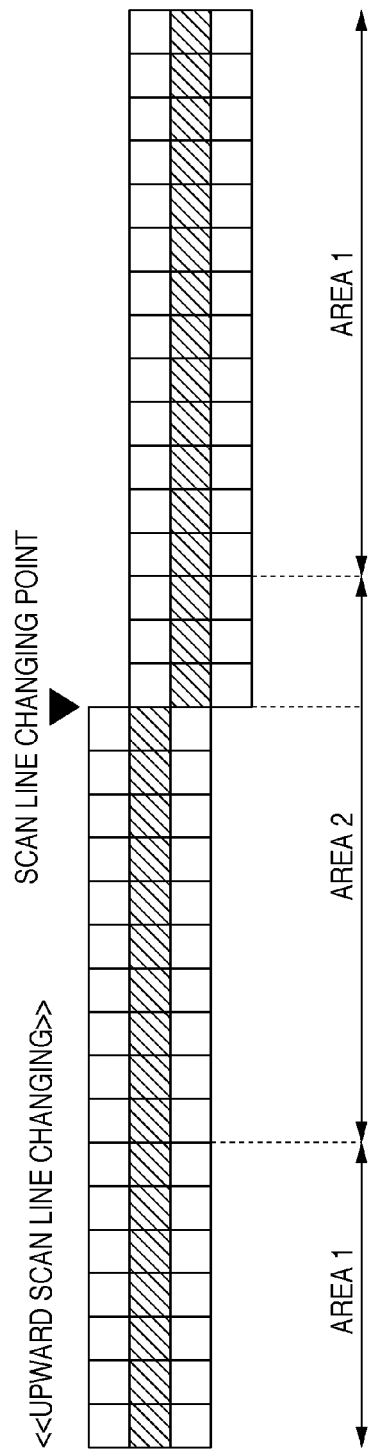
Figure 13F:
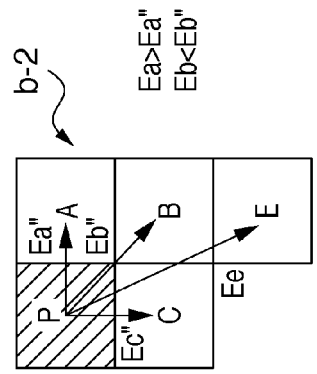
Figure 13E:

Upward correction when changing the line of interest to an upper line in the scan line changing process will be explained. FIG. 13D shows a case where upward correction is performed as a correction process at a scan line changing point by the image processing section 402. FIGS. 13E and 13F are views showing error diffusion matrices and error distributions in this case. This description also assumes setting of areas divided similarly to those in downward correction, but the area arrangement may also be different from that in downward correction. Even when the correction direction is upward, the error diffusion matrix applied to area 1 may also be the same as that in downward correction. That is, the structure of an error diffusion matrix b-1 and the distribution of the errors Ea, Eb, Ec, and Ed shown in FIG. 13E suffice to be the same as the structure of the error diffusion matrix a-1 and the distribution of the errors shown in FIG. 13B.

A feature of the upward scan line changing process is the shape of an error diffusion matrix applied to pixels belonging to area 2. When the line of interest changes to a line below it by one pixel at a scan line changing point, pixels below the pixel of interest move apart from it by one pixel. In upward correction, an error diffusion process for pixel data of area 2 including a scan line changing point uses an error diffusion matrix b-2 shown in FIG. 13F. In the error diffusion matrix b-2, the error distribution destination is changed to the second next line below the line of interest in the sub-scanning direction, compared to the matrix b-1. In downward correction, errors distributed to pixels A, B, and C adjacent to the pixel P of interest, and pixel E serving as an error distribution destination are set to Ea", Eb", Ec", and Ee in accordance with the matrix b-2 while setting Ea>Ea" and Eb<Eb". Unlike the error diffusion matrix for area 1, the error Ee is distributed to even pixel E below the pixel P of interest by two lines in the sub-scanning direction. Errors are set to Ea>Ea" and Eb<Eb" in order to decrease the ratio of an error distributed to a pixel spaced apart from the pixel of interest. Ec" may also be equal to Ec. No error is distributed to adjacent pixel D in FIG. 13F, but an error may also be distributed to it.

Image data having undergone the scan line changing process in accordance with the profile of the image forming section is printed as an image by the image forming section having this profile. The image data has a step between pixels before and after the scan line changing point as a result of the scan line changing process. The distortion of the pixel array is canceled by image formation, but the step between pixels still remains. This step is made inconspicuous by a switching process to switch the error diffusion matrix, the error distribution, or both of them between an area near a scan line changing point and the remaining area. Thus, even when correction of more than one line is performed in readout from the storage unit 408, an unnatural step before and after the scan line changing point can be reduced to prevent an image of poor quality visualized as unevenness or the like.

An error diffusion process sequence executed by the halftone processing unit 407 will be described with reference to FIG. 1. FIG. 1 is a flowchart showing the error diffusion process sequence by the halftone processing unit 407 in the present invention. The halftone processing unit may also be implemented by, e.g., a CPU and a memory which stores a program. In this case, FIG. 1 shows the sequence of the program. Profile information representing the positions of scan line changing points is obtained in advance by measuring a scan line for each image forming unit, and stored in the profile storage unit 403.

In the error diffusion process, when N-ary image data are stored in the storage unit 406, they are read out from the storage unit 406 at a predetermined timing. The halftone processing units 407C, 407M, 407Y, and 407K for the respective colors start an image formation process for the readout image data. The sequence in FIG. 1 shows a process by the halftone processing unit for one color component, and this process is executed for the respective color components. The process proceeds by giving attention to respective pixels in the raster scanning order.

The halftone processing unit 407 determines whether the pixel of interest to be processed belongs to area 1 (step S101).

In step S101, the halftone processing unit 407 refers to the position and direction of a scan line changing point included in the profile information, and if the pixel of interest does not exist in a separately defined range from the scan line changing point, determines that the pixel of interest belongs to area 1. If the pixel of interest belongs to area 1, the halftone processing unit 407 for each color performs a quantization process based on the error diffusion matrix (first error distribution) of area 1 (step S102). Error diffusion matrices for area 1 and area 2 are created in advance and stored in the halftone processing unit. As for area 2, error diffusion matrices are created and stored for respective scan line changing directions. That is, when the scan line changing direction in area 2 including the pixel of interest at a position in the laser scanning direction, i.e., main scanning direction is downward, the matrix a-1 in FIG. 13B is used. When the scan line changing direction is upward, the matrix b-1 in FIG. 13E is used to perform the quantization process. The profile information also includes the scan line changing direction.

If the halftone processing unit 407 determines in step S101 that the pixel of interest belongs to area 2, it determines whether the scan line changing direction at the scan line changing point in area 2 including the pixel of interest is downward (step S103). If the scan line changing direction is downward, the halftone processing unit 407 performs a quantization process based on the second error distribution, i.e., the error diffusion matrix a-2 in FIG. 13C (step S104).

If the halftone processing unit 407 determines in step S103 that the scan line changing direction at the scan line changing point in area 2 including the pixel of interest is upward, it performs a quantization process based on the third error distribution, i.e., the error diffusion matrix b-2 in FIG. 13F (step S105).

The halftone processing unit 407 for each color repetitively executes the processes in steps S101 to S105 until the quantization process is completed for entire image data for forming an image (S106). More specifically, the halftone processing unit 407 determines, based on the position of the pixel of interest in the main scanning direction, whether the pixel of interest belongs to an area including a scan line changing point, and if so, selects and uses an error diffusion matrix for image formation in consideration of even the scan line changing direction.

The storage unit 408 stores image data generated by steps S101 to S105. The image data is read out from the storage unit 408 while being shifted in the sub-scanning direction, as correction of more than one pixel at a scan line changing point in correspondence with the profile 416 held in the image forming section 401. The readout image data is input to the interpolation determining unit 409. The interpolation determining unit 409 basically determines not to perform interpolation for image data generated by the error diffusion process. The transfer buffer 411 stores this determination result, and image data checked by the timing adjusting unit 410. This is because, if the interpolation process is done for a continuous tone image, it causes degradation of the image quality such as density unevenness.

The determination result of the interpolation determining unit 409 that no interpolation is performed, and the image data are properly read out from the transfer buffer 411, and input to the interpolation processing unit 412. Based on the interpolation determination result, the interpolation processing unit 412 performs a process. Image data output from the interpolation processing unit 412 is output to the image forming section 401 via the PWM 413 for each color. The image forming section 401 prints and fixes input image data of each color. At this time, image data of each color is output in accordance with the skew characteristic of laser scanning held in each profile 416 in the image forming section 401.

Figure 17:
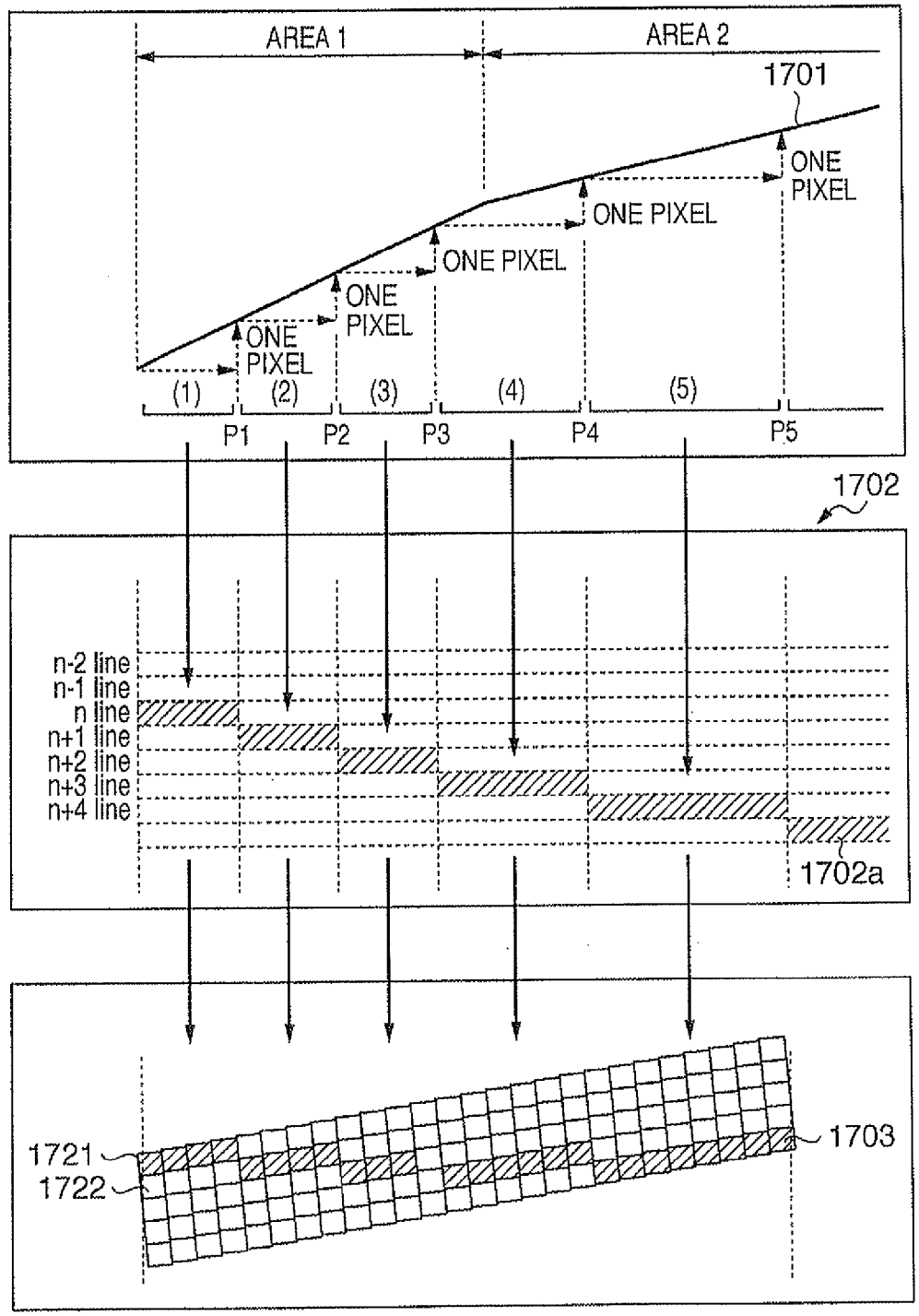
FIG. 17 is a view for explaining the state of image formation.
Figure 18A:
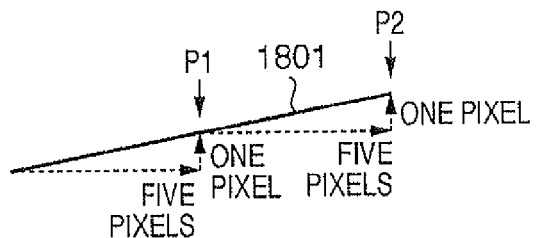

FIG. 17 shows an example of output. Image data formed by an image forming unit having the profile 1701 undergoes a scan line changing process in accordance with the profile, like the image data 1702. For example, the hatched pixel arrays 1702a in original image data are replaced with different lines at respective scan line changing points by the scan line changing process. When the resultant image data is formed as an image by an image forming unit having the profile 1701, it is substantially arranged on an ideal scan line (horizontal direction in FIG. 17) though steps still exist at scan line changing points, like the pixel arrays 1703.

As described above, according to the first embodiment, the error diffusion matrix is switched to reduce discontinuity between pixels that is generated by forming a pixel shifted at a scan line changing point, at a position where the shift is canceled in image formation. More specifically, the error diffusion process can be executed to distribute the quantization error of the pixel of interest to pixels around the pixel of interest in a finally formed image in consideration of the arrangement of pixels after image formation. As a result, the registration error between images of the respective color components can be corrected, and degradation of the image quality by the error diffusion upon the registration error correction process can be prevented.

Second Embodiment

In the first embodiment, the image formation process is performed while determining whether the scan line changing point appears in image formation by the halftone processing unit 407 which executes image formation. However, embodiments of the present invention are not limited to the first embodiment. In a description of the second embodiment, the same explanatory views and reference numerals as those used in the first embodiment denote the same parts.

In the second embodiment, the arrangement of image data input to a halftone processing unit 407 which forms an image undergoes a halftone process while undergoing a scan line changing process. In the first embodiment, in FIG. 11, image data processed by the halftone processing unit 407, i.e., image data stored in the storage unit 408 has not undergone the scan line changing process. However, in the second embodiment, when image data is stored in a storage unit 408, it has undergone the scan line changing process.

Figure 14:
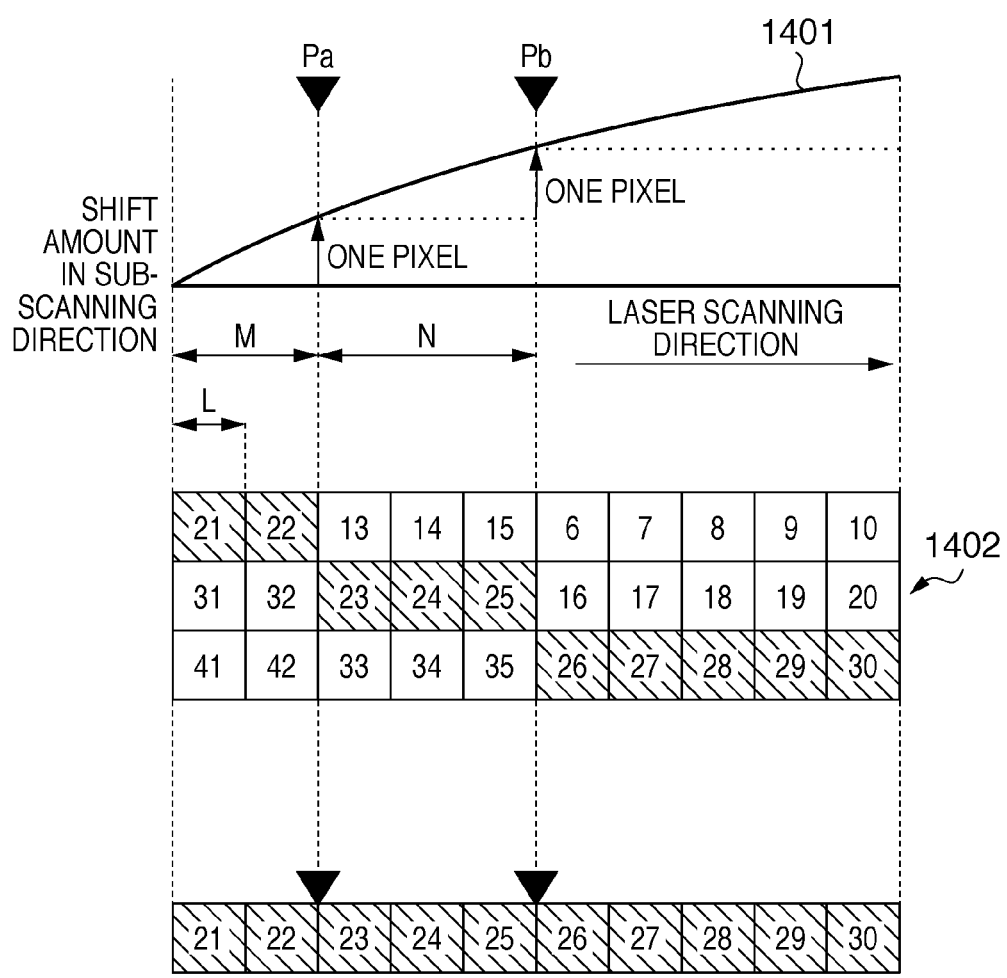
FIG. 14 is a view showing correction of more than one pixel in the second embodiment of the present invention.

FIG. 14 is a view showing the correlation between a direction in which an image processing section 402 performs correction, and the arrangement of image data in the second embodiment. FIG. 14 is a view showing the direction in which the image processing section 402 performs correction, and is basically the same as FIG. 11. Pa and Pb represent scan line changing points where the scan line shifts by one pixel in the sub-scanning direction.

L represents the minimum pixel interval between scan line changing points. In the example of FIGS. 6A to 6D, 16 pixels correspond to L. The scan line changing point Pa is a point where the scan line shifts upward in the sub-scanning direction by one pixel from a reference point, and is at a position corresponding to double the minimum scan line changing point interval L (double the number of pixels). Similarly, the scan line changing point Pb is a point where the scan line shifts upward in the sub-scanning direction by one pixel from the scan line changing point Pa, and is at a position corresponding to triple the minimum scan line changing point interval L (triple the number of pixels).

In the second embodiment, when image data is input to the halftone processing unit 407, i.e., read out from a storage unit 406, the scan line changing process is done at a scan line changing point based on a profile 416 for each color that is held in an image forming section 401. If profile information 1401 as shown in FIG. 14 recording the position and direction at which the image processing section 402 performs correction is stored, image data is shifted by one pixel in the sub-scanning direction, as represented by an image 1402, when input to the halftone processing unit 407.

Upon readout from the storage unit 406, the halftone processing unit 407 executes a quantization process by an error diffusion process for image data having undergone the scan line changing process. Also in the second embodiment, similar to the first embodiment, the image data is divided into an area (area 2) including a scan line changing point and an area (area 1) including no scan line changing point. The error diffusion matrix and error distribution used for the error diffusion process are changed to perform the image formation process. The sequence of the error diffusion process is the same as that in the first embodiment.

Figure 15A:
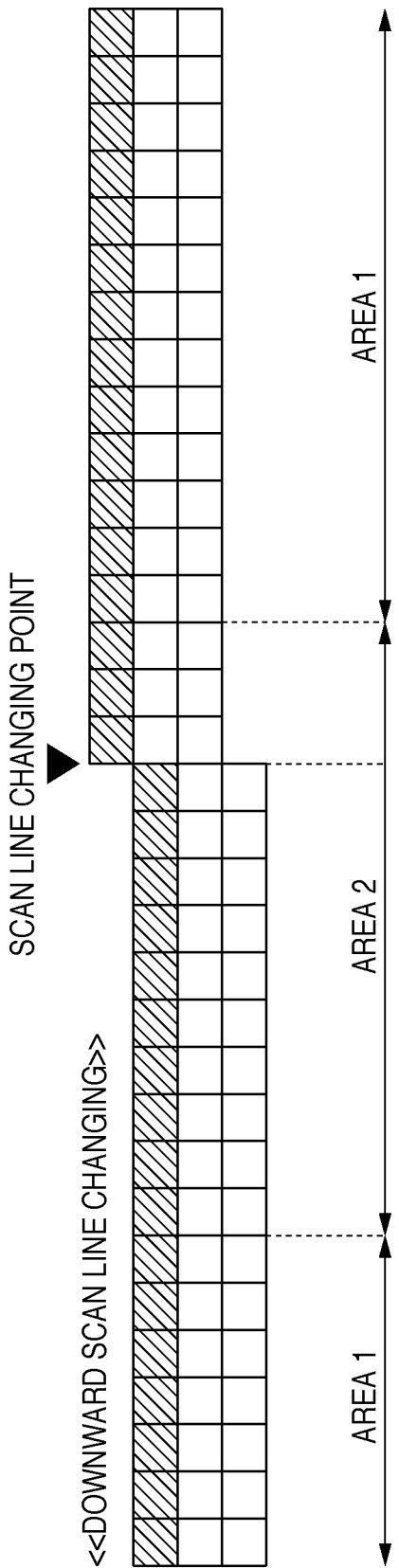
FIGS. 15A to 15F are views showing error diffusion matrices and error distributions in the second embodiment of the present invention.
Figure 15C:
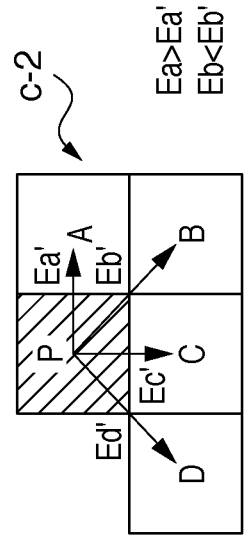
Figure 15B:
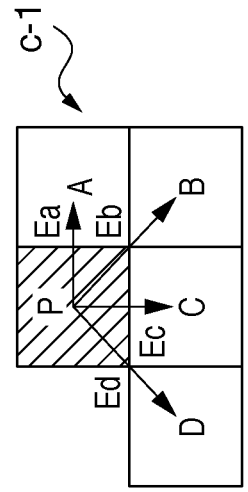

FIGS. 15A to 15C show error diffusion matrices and error distributions used for image formation in each area in downward scan line changing. Also in FIG. 15A, similar to FIG. 13A, rectangles represent the pixel arrangement, and area 2 is made up of 10 pixels before a scan line changing point and three pixels after it.

When image data processed by the halftone processing unit 407 belongs to area 1, the error diffusion process by the halftone processing unit 407 uses an error diffusion matrix c-1 shown in FIG. 15B to perform quantization. More specifically, quantization is done while distributing an error generated upon quantization of a hatched pixel P of interest to adjacent pixels by weighting calculation. An error Ea obtained by weighting calculation is distributed to adjacent pixel A, and an error Eb obtained by weighting calculation is distributed to adjacent pixel B. Similarly, an error Ec is distributed to adjacent pixel C, and an error Ed is distributed to adjacent pixel D.

In area 2, quantization is executed using an error diffusion matrix c-2 shown in FIG. 15C. However, when the correction direction is downward, the error diffusion matrix c-1 may also be used without changing the shape of the error diffusion matrix. In this case, the error distribution to pixels A, B, C, and D adjacent to the pixel P of interest is different from that in area 1. Since the correction direction at the scan line changing point is downward, an error distributed to the next line is preferably larger than that in area 1 at the scan line changing point serving as a reference. In area 2, therefore, errors distributed to pixels A, B, C, and D adjacent to the pixel P of interest are set to Ea', Eb', Ec', and Ed' while setting Ea>Ea' and Eb<Eb'. By changing the error distribution, an unnatural step before and after the scan line changing point is reduced in image data printed out by the image forming section 401.

Figure 15D:
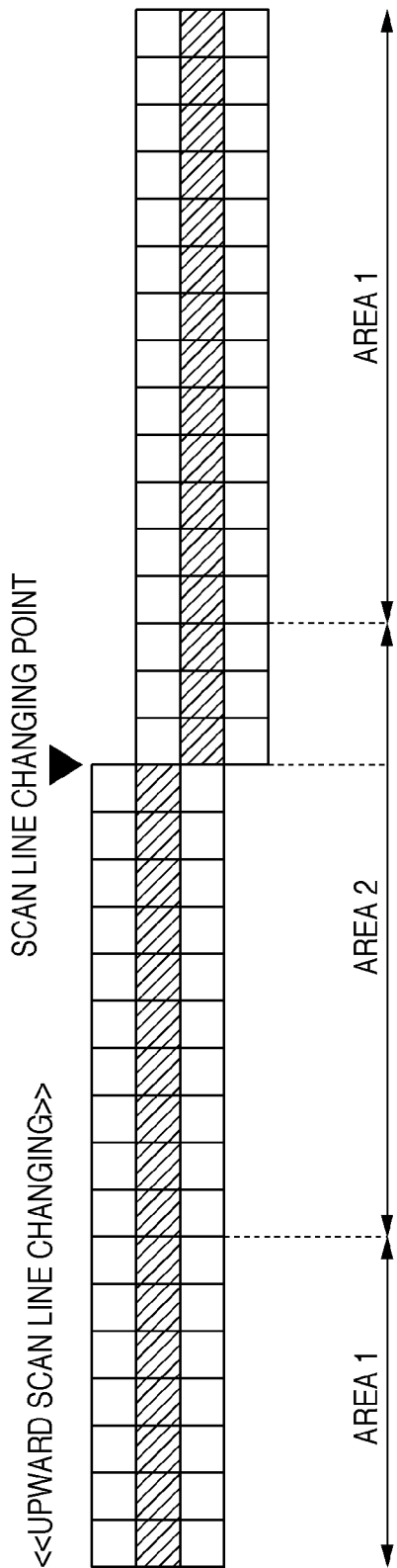
Figure 15F:
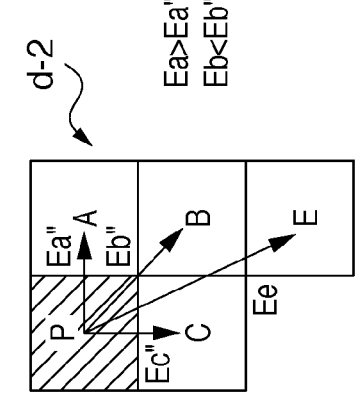
Figure 15E:
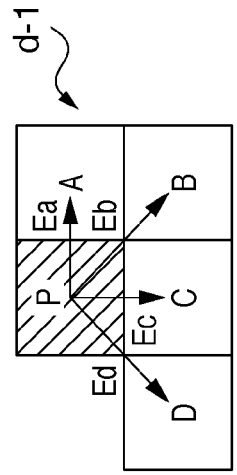
Figure 16A:
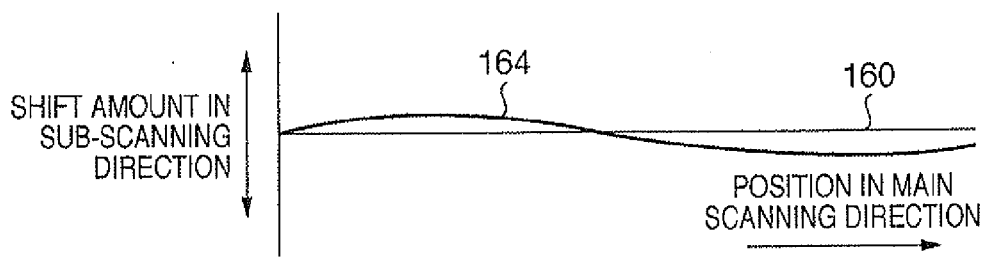
FIGS. 16A to 16D are graphs for explaining the prior art.
Figure 16B:
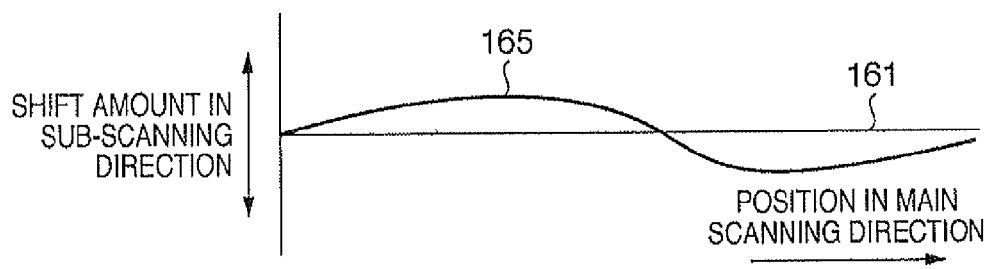
Figure 16C:
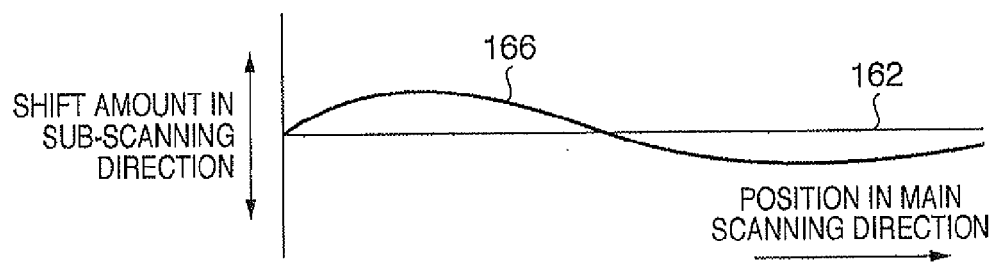
Figure 16D:
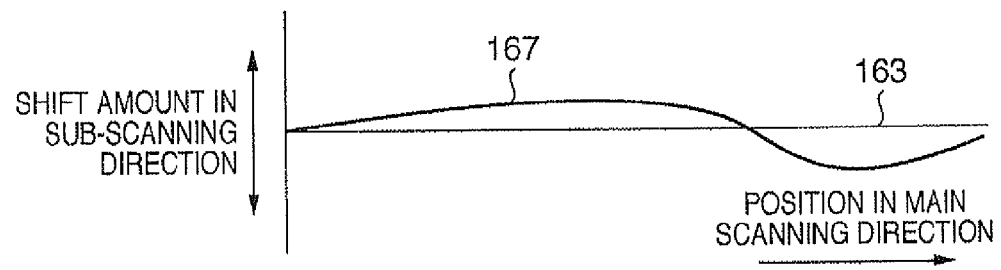

A case where the correction direction is upward will be explained. FIG. 15D shows setting of areas when the correction direction is upward. FIGS. 15E and 15F are views showing the shapes of error diffusion matrices in the respective areas. This description also assumes setting of areas when performing downward correction, but the area arrangement is not limited to one described below.

Even when the correction direction is upward, the error diffusion matrix applied to area 1 may also be the same as that in downward correction. That is, the structure of an error diffusion matrix d-1 and the distribution of the errors Ea, Eb, Ec, and Ed shown in FIG. 15E suffice to be the same as the structure of the error diffusion matrix c-1 and the distribution of the errors shown in FIG. 15B.

A feature of upward correction is the shape of an error diffusion matrix applied to pixels belonging to area 2. When correction of more than one pixel is done at a scan line changing point, adjacent pixels serving as error distribution destinations shift farther in the sub-scanning direction. Hence, in upward correction, image formation of pixel data in area 2 including a scan line changing point uses an error diffusion matrix d-2 which changes the error distribution destination in the sub-scanning direction, as shown in FIG. 15F.

More specifically, in upward correction, errors distributed to pixels A, B, and C adjacent to the pixel P of interest, and pixel E serving as an error distribution destination are set to Ea", Eb", Ec", and Ee while setting Ea>Ea" and Eb<Eb". Unlike the error diffusion matrix for area 1, the error Ee is distributed to even pixel E below the pixel P of interest by two lines in the sub-scanning direction. By changing the error diffusion matrix and error distribution in this way, an unnatural step before and after the scan line changing point can be reduced in image data printed out by the image forming section 401. In the second embodiment, the error diffusion process is the same as that in the first embodiment.

Image data formed by the halftone processing unit 407 is stored in the storage unit 408, but when read out from the storage unit 408, does not undergo a correction process, i.e., scan line changing process of more than one pixel at a scan line changing point, unlike the first embodiment.

A subsequent process for image data read out from the storage unit 408 is the same as that described in the first embodiment, and a description thereof will be omitted.

By performing the process in this manner, an error diffusion process considering in advance the arrangement of pixels after image formation can be done. That is, the error diffusion process can be executed to distribute the quantization error of the pixel of interest to pixels around the pixel of interest in a finally formed image in consideration of the arrangement of pixels after image formation. Even when the scan line changing process is done prior to the error diffusion process, the same effects as those of the first embodiment can be obtained.

The first and second embodiments can execute image formation considering the profile characteristic when performing image formation near a scan line changing point in correction of more than one pixel in correspondence with the profile characteristic of the image forming apparatus. More specifically, when the image forming method is the error diffusion process, the error diffusion matrix and error distribution used near a scan line changing point are switched in consideration of the correction direction at the scan line changing point. This can reduce density unevenness and a texture at a scan line changing point in a printout image.

The present invention may also be applied to a system including a plurality of devices (e.g., a host computer, interface device, reader, and printer), or an apparatus (e.g., a copying machine or facsimile apparatus) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from the storage medium implement the functions of the above-described embodiments, and the storage medium which stores the program codes constitutes the present invention.

The present invention also includes a case where an OS (Operating System) or the like running on the computer performs part or all of actual processing on the basis of the instructions of the program codes and thereby implements the functions of the above-described embodiments. Further, the present invention is also applied to a case where the program codes read out from the storage medium are written in the memory of a function expansion card inserted into the computer or the memory of a function expansion unit connected to the computer. In this case, the CPU or the like of the function expansion card or function expansion unit performs part or all of actual processing on the basis of the instructions of the program codes, and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2007-199899, filed Jul. 31, 2007 which is hereby incorporated by reference herein in its entirety.

What is claimed is:

1. An image forming apparatus which has an image forming unit for forming an image, comprising:
   a storage configured to store profile information representing a profile of a scan line on an image carrier of the image forming unit, wherein the profile information contains at least one pair of a pixel position in the scan line direction and a shift amount of pixels following the pixel position in the scan line in a sub-scanning direction, and wherein the profile of the scan line is due to positional errors of the image forming unit;
   an error diffusion processing unit configured to perform an error diffusion process for image data; and
   a registration error correction unit configured to correct the image data by shifting by one pixel, for each pixel data in the sub-scanning direction, a position of each pixel data in the image data quantized by said error diffusion processing unit, on the basis of the profile information so as to offset the shift amount of the scan line in the sub-scanning direction on the image carrier of the image forming unit,
   wherein said error diffusion processing unit diffuses an error on the basis of the profile information, at distributions different between a predetermined second area including a position where the image data is shifted in the sub-scanning direction by said registration error correction unit, and a first area separate from the second area, wherein the second area and the first area are in the image data.

2. An image forming apparatus which has an image forming unit for forming an image, comprising:
   a storage configured to store profile information representing a profile of a scan line on an image carrier of the image forming unit, wherein the profile information contains at least one pair of a pixel position in the scan line direction and a shift amount of pixels following the pixel position in the scan line in a sub-scanning direction, and wherein the profile of the scan line is due to positional errors of the image forming unit;
   a registration error correction unit configured to correct the image data by shifting by one pixel, for each pixel data in the sub-scanning direction, a position of each pixel data in image data to be processed on the basis of the profile information so as to offset the shift amount of the scan line in the sub-scanning direction on the image carrier of the image forming unit; and
   an error diffusion processing unit configured to perform an error diffusion process for the image data processed by said registration error correction unit,
   wherein said error diffusion processing unit diffuses an error on the basis of the profile information, at distributions different between a predetermined second area including a position where the image data is shifted in the sub-scanning direction by said registration error correction unit, and a first area separate from the second area, wherein the second area and the first area are in the image data.

3. The apparatus according to claim 1, wherein
   when said registration error correction unit shifts pixels by connecting a line of interest of the image data to a line below the line of interest in order to offset the shift amount of the scan line in the sub-scanning direction, said error diffusion processing unit increases an error distribution to a next line for a pixel of interest belonging to the second area, compared to the first area, and
   when said registration error correction unit shifts pixels by connecting the line of interest of the image data to a line above the line of interest in order to offset the shift amount of the scan line in the sub-scanning direction, said error diffusion processing unit increases an error distribution to a line second next to the pixel of interest for the pixel of interest belonging to the second area.

4. The apparatus according to claim 2, wherein
   when said registration error correction unit shifts pixels by connecting a line of interest of the image data to a line below the line of interest in order to offset the shift amount of the scan line in the sub-scanning direction, said error diffusion processing unit increases an error distribution to a next line for a pixel of interest belonging to the second area, compared to the first area, and
   when said registration error correction unit shifts pixels by connecting the line of interest of the image data to a line above the line of interest in order to offset the shift amount of the scan line in the sub-scanning direction, said error diffusion processing unit increases an error distribution to a line second next to the pixel of interest for the pixel of interest belonging to the second area.

5. An image forming method in an image forming apparatus which has an image forming unit for forming an image, and a storage that stores profile information representing a profile of a scan line on an image carrier of the image forming unit, wherein the profile information contains at least one pair of a pixel position in the scan line direction and a shift amount of pixels following the pixel position in the scan line in a sub-scanning direction, and wherein the profile of the scan line is due to positional errors of the image forming unit, the method comprising:
   an error diffusion processing step of performing an error diffusion process for image data; and
   a registration error correction step of correcting the image data by shifting by one pixel, for each pixel data in the sub-scanning direction, a position of each pixel data in the image data quantized in the error diffusion processing step, on the basis of the profile information so as to offset the shift amount of the scan line in the sub-scanning direction on the image carrier of the image forming unit,
   wherein in the error diffusion processing step, an error is diffused based on the profile information, at distributions different between a predetermined second area including a position where the image data is shifted in the sub-scanning direction in the registration error correction step, and a remaining first area separate from the second area, wherein the second area and the first area are in the image data.

6. An image forming method in an image forming apparatus which has an image forming unit for forming an image, and a storage that stores profile information representing a profile of a scan line on an image carrier of the image forming unit, wherein the profile information contains at least one pair of a pixel position in the scan line direction and a shift amount of pixels following the pixel position in the scan line in a sub-scanning direction, and wherein the profile of the scan line is due to positional errors of the image forming unit, the method comprising:
- a registration error correction step of correcting the image data by shifting by one pixel, for each pixel data in the sub-scanning direction, a position of each pixel data in the image data to be processed on the basis of the profile information so as to offset the shift amount of the scan line in the sub-scanning direction on the image carrier of the image forming unit; and
- an error diffusion processing step of performing an error diffusion process for the image data processed in the registration error correction step,
- wherein in the error diffusion processing step, an error is diffused based on the profile information, at distributions different between a predetermined second area including a position where the image data is shifted in the sub-scanning direction in the registration error correction step, and a first area separate from the second area, wherein the second area and the first area are in the image data.

7. A non-transitory computer-readable storage medium storing a program to cause an image forming apparatus which has an image forming unit for forming an image, to function as
- a storage configured to store profile information representing a profile of a scan line on an image carrier of the image forming unit, wherein the profile information contains at least one pair of a pixel position in the scan line direction and a shift amount of pixels following the pixel position in the scan line in a sub-scanning direction, and wherein the profile of the scan line is due to positional errors of the image forming unit,
- an error diffusion processing unit configured to perform an error diffusion process for image data, and
- a registration error correction unit configured to correct the image data by shifting by one pixel, for each pixel data in the sub-scanning direction, a position of each pixel data in the image data quantized by said error diffusion processing unit, on the basis of the profile information so as to offset the shift amount of the scan line in the sub-scanning direction on the image carrier of the image forming unit,
- wherein said error diffusion processing unit diffuses an error on the basis of the profile information, at distributions different between a predetermined second area including a position where the image data is shifted in the sub-scanning direction by said registration error correction unit, and a first area separate from the second area, wherein the second area and the first area are in the image data.

8. A non-transitory computer-readable storage medium storing a program to cause an image forming apparatus which has an image forming unit for forming an image, to function as
- a storage configured to store profile information representing a profile of a scan line on an image carrier of the image forming unit, wherein the profile information contains at least one pair of a pixel position in the scan line direction and a shift amount of pixels following the pixel position in the scan line in a sub-scanning direction, and wherein the profile of the scan line is due to positional errors of the image forming unit,
- a registration error correction unit configured to correct the image data by shifting by one pixel, for each pixel data in the sub-scanning direction, a position of each pixel data in the image data to be processed on the basis of the profile information so as to offset the shift amount of the scan line in the sub-scanning direction on the image carrier of the image forming unit, and
- an error diffusion processing unit configured to perform an error diffusion process for the image data processed by said registration error correction unit,
- wherein said error diffusion processing unit diffuses an error on the basis of the profile information, at distributions different between a predetermined second area including a position where the image data is shifted in the sub-scanning direction by said registration error correction unit, and a first area separate from the second area, wherein the second area and the first area are in the image data.

* * * * *